(12) United States Patent
Takahashi et al.

(10) Patent No.: US 8,037,077 B2
(45) Date of Patent: Oct. 11, 2011

(54) COMPUTER-READABLE RECORDING MEDIUM, METHOD, AND APPARATUS FOR CREATING MESSAGE PATTERNS

(75) Inventors: Hidekazu Takahashi, Kawasaki (JP); Motoyuki Kawaba, Kawasaki (JP); Yuuji Hotta, Kawasaki (JP); Lilian Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 270 days.

(21) Appl. No.: 12/533,926

(22) Filed: Jul. 31, 2009

(65) Prior Publication Data
US 2010/0076974 A1 Mar. 25, 2010

(30) Foreign Application Priority Data
Sep. 11, 2008 (JP) .................................. 2008-233419

(51) Int. Cl.
*G06F 17/00* (2006.01)
(52) U.S. Cl. ...................................................... 707/747
(58) Field of Classification Search .................... 707/737
See application file for complete search history.

(56) References Cited

U.S. PATENT DOCUMENTS

| | | | |
|---|---|---|---|
| 5,857,179 A * | 1/1999 | Vaithyanathan et al. ............. | 1/1 |
| 6,584,456 B1 * | 6/2003 | Dom et al. ....................... | 706/45 |
| 6,654,787 B1 * | 11/2003 | Aronson et al. ............. | 709/206 |
| 6,728,932 B1 * | 4/2004 | Chundi et al. ................. | 715/230 |
| 7,233,943 B2 * | 6/2007 | Modha et al. .......................... | 1/1 |
| 7,640,305 B1 * | 12/2009 | Arthur et al. .................. | 709/206 |
| 2003/0074369 A1 * | 4/2003 | Schuetze et al. .......... | 707/103 R |
| 2004/0133560 A1 * | 7/2004 | Simske .............................. | 707/3 |
| 2005/0086224 A1 * | 4/2005 | Franciosa et al. .................. | 707/6 |
| 2005/0203970 A1 * | 9/2005 | McKeown et al. ............ | 707/203 |
| 2006/0026152 A1 * | 2/2006 | Zeng et al. .......................... | 707/5 |
| 2006/0089924 A1 * | 4/2006 | Raskutti et al. ..................... | 707/1 |
| 2007/0156732 A1 * | 7/2007 | Surendran et al. ............. | 707/101 |
| 2009/0089272 A1 * | 4/2009 | Oliver et al. ....................... | 707/5 |

FOREIGN PATENT DOCUMENTS

| | | |
|---|---|---|
| JP | A 5-61697 | 3/1993 |
| JP | A 11-53323 | 2/1999 |

OTHER PUBLICATIONS

Chang & Hsu, Using Topic Keyword Clusters for Automatic Documetn Clustering, 2005, Proceedings of the Third International Conference on Infrormation Technology and Applications, IEEE.*

* cited by examiner

*Primary Examiner* — Charles Kim
*Assistant Examiner* — Kurt Mueller
(74) *Attorney, Agent, or Firm* — Greer, Burns & Crain, Ltd.

(57) ABSTRACT

An apparatus receives messages having a linking keyword for identification of a transaction, classifies the received messages in terms of transaction using message patterns and the linking keyword. It compares a series of messages associated with the transaction with the message patterns. It makes a decision as to whether the series of messages associated with the transaction matches any one of the message patterns. It creates a record including an identifier for the transaction and the linking keyword. It searches for the unclassified messages based on the linking keywords contained in the unclassified messages, and identifies the record containing the identical linking keyword. It stores the identifiers for the unclassified messages into a linked candidate list in a corresponding manner to linked candidate transactions. It adds the unclassified messages to the message pattern which corresponds to the linked candidate transaction to create a new message pattern.

6 Claims, 26 Drawing Sheets

FIG. 6

| ID | TRANTYPE | CONDITION | cnt | SPIN-OFF MESSAGE PATTERN | ASSOCIATED MESSAGE PATTERN | CANDIDATE FLAG |
|---|---|---|---|---|---|---|
| P01 | Order | ... | 550 | P11 | | 0 |
| P02 | Modify | ... | 300 | P12 | | 0 |
| ... | ... | ... | ... | ... | ... | ... |
| P11 | ... | ... | 10 | | P12 | 1 |
| P12 | ... | ... | 1 | | P11 | 1 |
| ... | ... | ... | ... | | ... | ... |

FIG. 8

| TranID | T_start | T_end | Keyword | PatternID |
|---|---|---|---|---|
| tran0 | t0 | t1 | tid1 sess0 ... | P1 |
| tran1 | t2 | t3 | tid2 sess0 ... | P2 |
| ... | ... | ... | ... | ... |

FIG. 9

| TranID | FIRST LIST OF LINKED CANDIDATES | SECOND LIST OF LINKED CANDIDATES |
|---|---|---|
| tran0 | Msg0, Msg1 | Msg3 |
| tran1 | Msg4 | Msg3, Msg5 |
| tran2 |  | Msg5 |
| . . . | . . . | . . . |

FIG. 25

| ID | TRANTYPE | CONDITION | cnt | SPIN-OFF MESSAGE PATTERN | ASSOCIATED MESSAGE PATTERN | CANDIDATE FLAG |
|---|---|---|---|---|---|---|
| P01 | Order | ... | 550 | | | 0 |
| P02 | Modify | ... | 300 | | | 0 |
| ... | ... | ... | ... | ... | ... | ... |
| P11 | ... | ... | 10 | P11 | | 0 |
| ... | ... | ... | ... | ... | ... | ... |

COMPUTER-READABLE RECORDING MEDIUM, METHOD, AND APPARATUS FOR CREATING MESSAGE PATTERNS

CROSS-REFERENCE TO RELATED APPLICATIONS

This application is based upon and claims the benefit of priority of the prior Japanese Patent Application No. 2008-233419, filed on Sep. 11, 2008, the entire contents of which are incorporated herein by reference.

FIELD

The disclosed techniques relate to techniques used in the computer field where message patterns employed to link messages are automatically created.

BACKGROUND

In a system having plural servers such as an electronic commercial transaction system, when a request from a client is received, messages are exchanged between servers and the process progresses. One example of the electronic commercial transaction system is shown in FIG. 1. In the electronic commercial transaction system, whenever a request is received by a web server, an application server (AP server) is required to perform processing that is necessitated by the request and results of the processing are obtained. Alternatively, a database server (DB server) is required by the request to make a reference to a database or update it, and results of the processing are obtained. In this way, plural messages are exchanged between servers, and processing is carried out. Furthermore, a log of the messages exchanged between the servers is gathered and used to monitor the behavior of the system or for other purposes. Messages required to make a response to one request are recognized as one transaction using keywords contained in the messages.

Where processing for classifying messages in terms of transaction and lining up messages associated with each individual transaction is performed (hereinafter may be referred to as a message linking process), it is conceivable to make a decision as to whether the linking process has been completed using a message pattern for each type of transaction (i.e., whether a full set of messages associated with the transaction has been obtained).

In this method, however, it is necessary to predefine message patterns. Some transactions are found after the system is run and so it is difficult to define all message patterns. In this method, if a transaction not defined as a message pattern is executed, it is impossible to judge correctly whether a full set of messages associated with the transaction has been obtained.

Accordingly, an object of the present technique is to provide a technique for automatic creating of message patterns used in a message linking process.

SUMMARY

An apparatus creates a message pattern. The apparatus successively receives messages each having a linking keyword for identification of a transaction. The apparatus classifies the received messages in terms of transaction using message patterns stored in a message pattern storage portion and the linking keyword whenever each of the messages is received. The apparatus compares a series of messages associated with the transaction to which the received message belongs with the message patterns stored in the message pattern storage portion. The apparatus makes a decision as to whether the series of messages associated with the transaction to which the received message belongs matches any one of the message patterns stored in the message pattern storage portion to thereby make a decision as to whether a linking process is completed. The apparatus creates a record including an identifier for the transaction to which the received message belongs and the linking keyword contained in messages associated with the transaction, if the linking process is judged to be completed, and storing the record into a transaction storage portion. The apparatus searches the transaction storage portion for each of the unclassified messages classified into none of the transactions among the received messages at given timing based on the linking keywords contained in the unclassified messages and identifies the record containing the identical linking keyword. The apparatus stores the identifiers for the unclassified messages into a linked candidate list storage portion in a corresponding manner to linked candidate transactions that are transactions associated with the identified record to thereby identify a linked candidate. The apparatus adds the unclassified messages stored in the linked candidate storage portion in a corresponding manner to the linked candidate transaction to the message pattern which is stored in the message pattern storage portion and which corresponds to the linked candidate transaction for each of the linked candidate transactions to create a new message pattern and storing the created message pattern into the message pattern storage portion.

BRIEF DESCRIPTION OF DRAWINGS

FIG. 6 illustrates an example of a table of message patterns;

FIG. 8 illustrates an example of a table of transactions;

FIG. 9 illustrates an example of a table of lists of linked candidates;

FIG. 25 illustrates an example of a message pattern table stored in a message pattern table storage portion.

DESCRIPTION OF EMBODIMENTS

Figure 1:
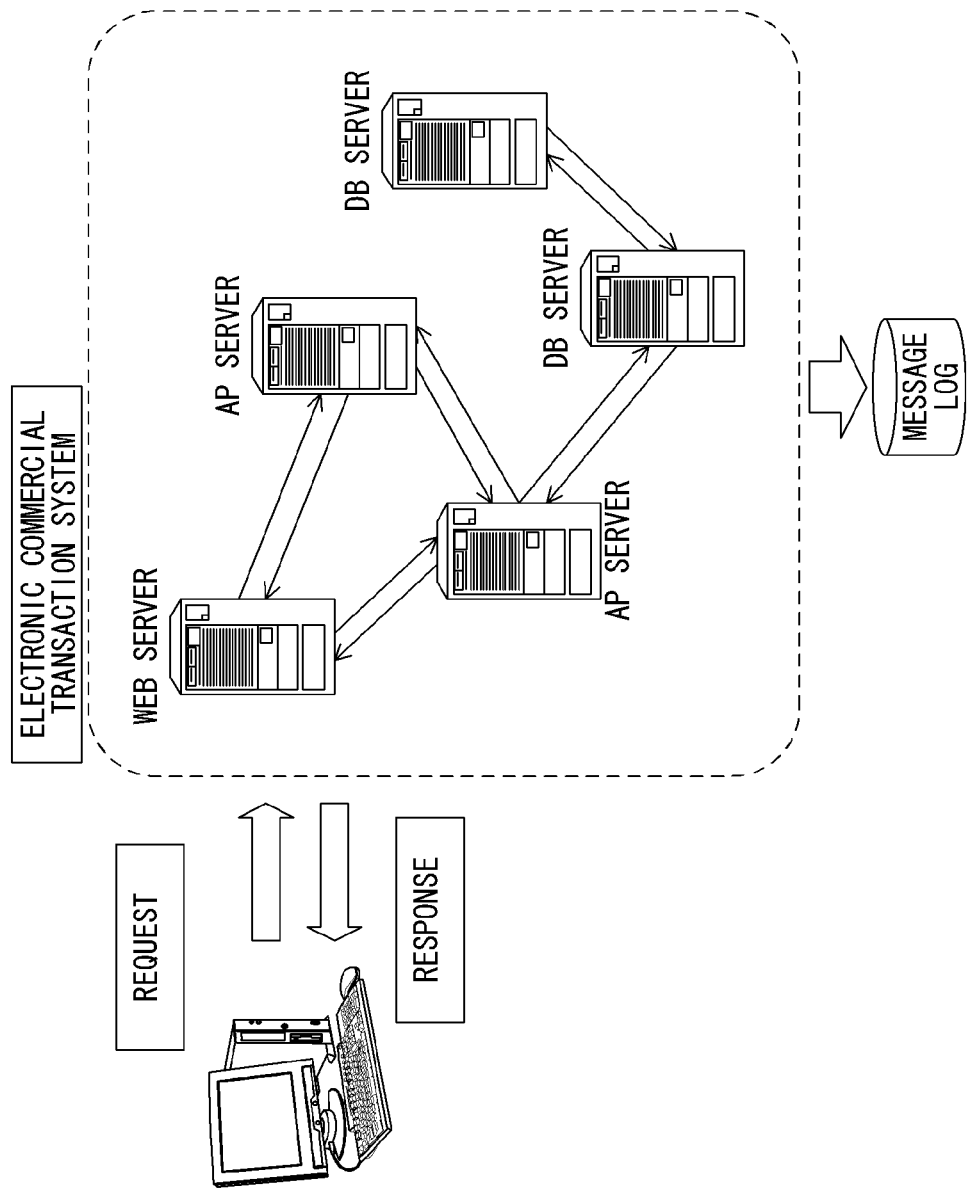
FIG. 1 illustrates one example of the related art electronic commercial transaction system.
Figure 2:
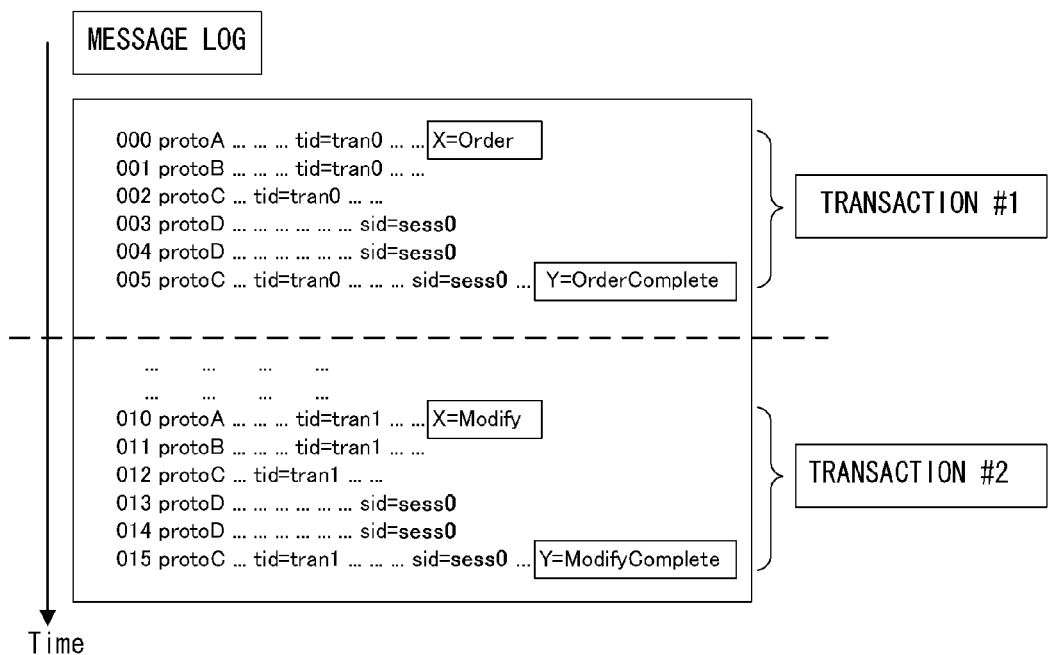
FIG. 2 illustrates a message linking process on which one embodiment of the present invention is based.

A message linking process on which one embodiment of the present invention is based is described. It is assumed, for example, that messages as shown in FIG. 2 have been exchanged between servers. In the example of FIG. 2, messages 000, 001, 002, and 005 have a common tag "tid" and a common tid value "tran0". Therefore, these messages are recognized as messages associated with an identical transaction. On the other hand, none of messages 003 and 004 have the tag "tid". Consequently, the messages 003 and 004 are judged not to be messages associated with the transaction of the former messages including the message 001. However, the messages 003, 004, and 005 have a common tag "sid" and a common sid value "sess0". Consequently, the messages 003, 004, and 005 are judged as messages associated with an identical transaction. Similarly, messages 010, 011, 012, and 015 have a common tag "tid" and an identical tid value "tran1" and so these messages are recognized as messages associated with an identical transaction. Messages 013 and 014 do not have the tag "tid" but have a tag "sid" in common with the message 015. Furthermore, the messages 013 and 014 have the same sid value "sess0" as the message 015. Accordingly, the messages 013, 014, and 015 are judged as messages associated with an identical transaction.

Figure 3:
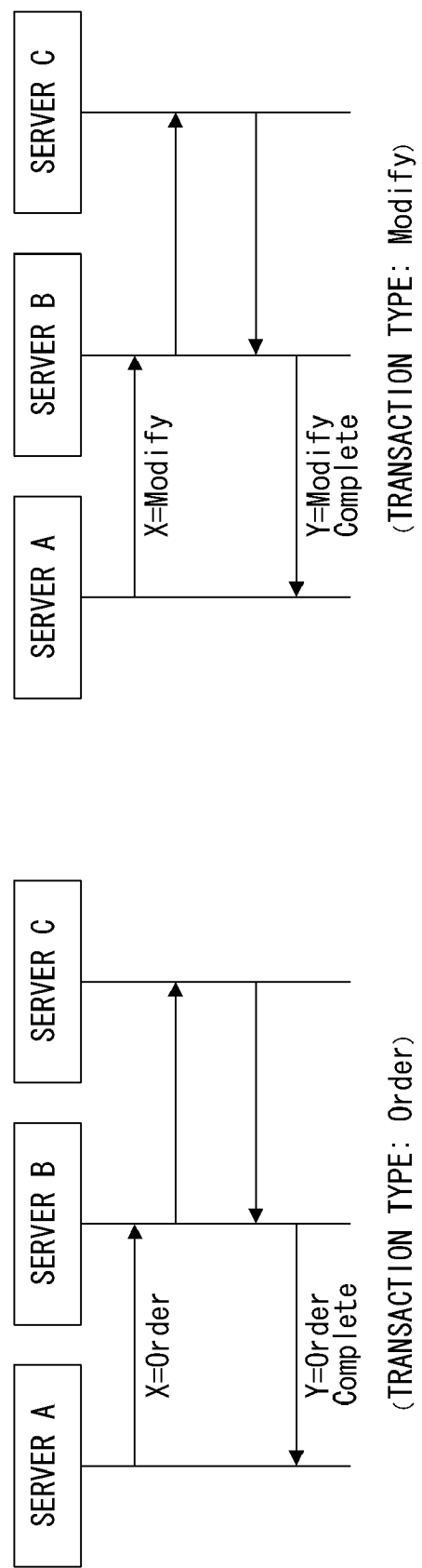
FIG. 3 illustrates a message pattern used in the message linking process.

Series of messages are made to assume different patterns according to transaction type, for example, as shown in FIG. 3. It is assumed that each known pattern has been predefined as a message pattern. In an on-line message-linking process, a decision is made as to whether the message pattern is coincident with any of the predefined message patterns. If a match is found, it is regarded that a full set of messages associated with the transaction has been obtained. Thus, it is determined that the linking process is completed. In FIG. 2, at the instant when the messages 000-005 are linked, the message pattern agrees with a message pattern having a transaction type "Order". It is determined that the linking process is completed. Therefore, the messages 005 and 015 have the common tag "sid" and the common sid value "sess0". However, the messages 005 and 015 are linked as separate transactions.

Figure 4:
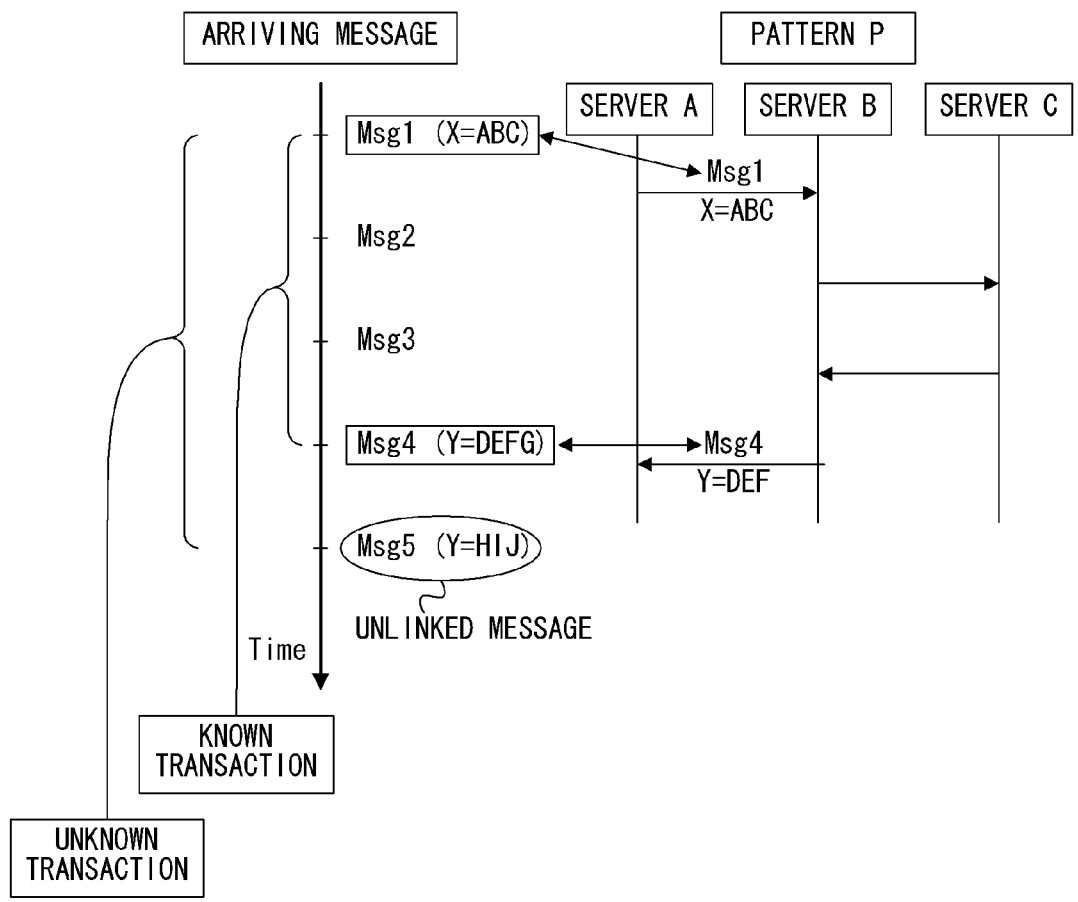
FIG. 4 illustrates the problem with the message linking process on which the present embodiment is based.

On the other hand, in this message-linking process, with respect to transactions not defined as message patterns, completion of linking is not correctly judged. For example, as shown in FIG. 4, in a case where an unknown transaction is executed, messages Msg1 to Msg5 can be linked. However, if a message pattern (such as pattern P) beginning with message Msg1 and ending with message Msg4 has been defined, the pattern becomes identical with the pattern P at the instant when the messages Msg1 to Msg4 are linked. As a result, it is determined that the linking is completed. The message Msg5 may not be linked forever.

Accordingly, in the present embodiment, a new message pattern (pattern P') is automatically created by searching for a transaction in which an unlinked message (in the above example, the message Msg5) might be linked and adding the unlinked message to the message pattern (in the above example, pattern P) corresponding to the transaction permitting the linking. In the message linking process, if the message pattern agrees with some message pattern (pattern P), in a case where there is a spin-off message pattern (pattern P') derived from the message pattern, it is not determined that the linking is completed. Rather, a check is made as to whether the message pattern is coincident with the spin-off message pattern. A system associated with one embodiment of the present technique is described below.

Figure 5:
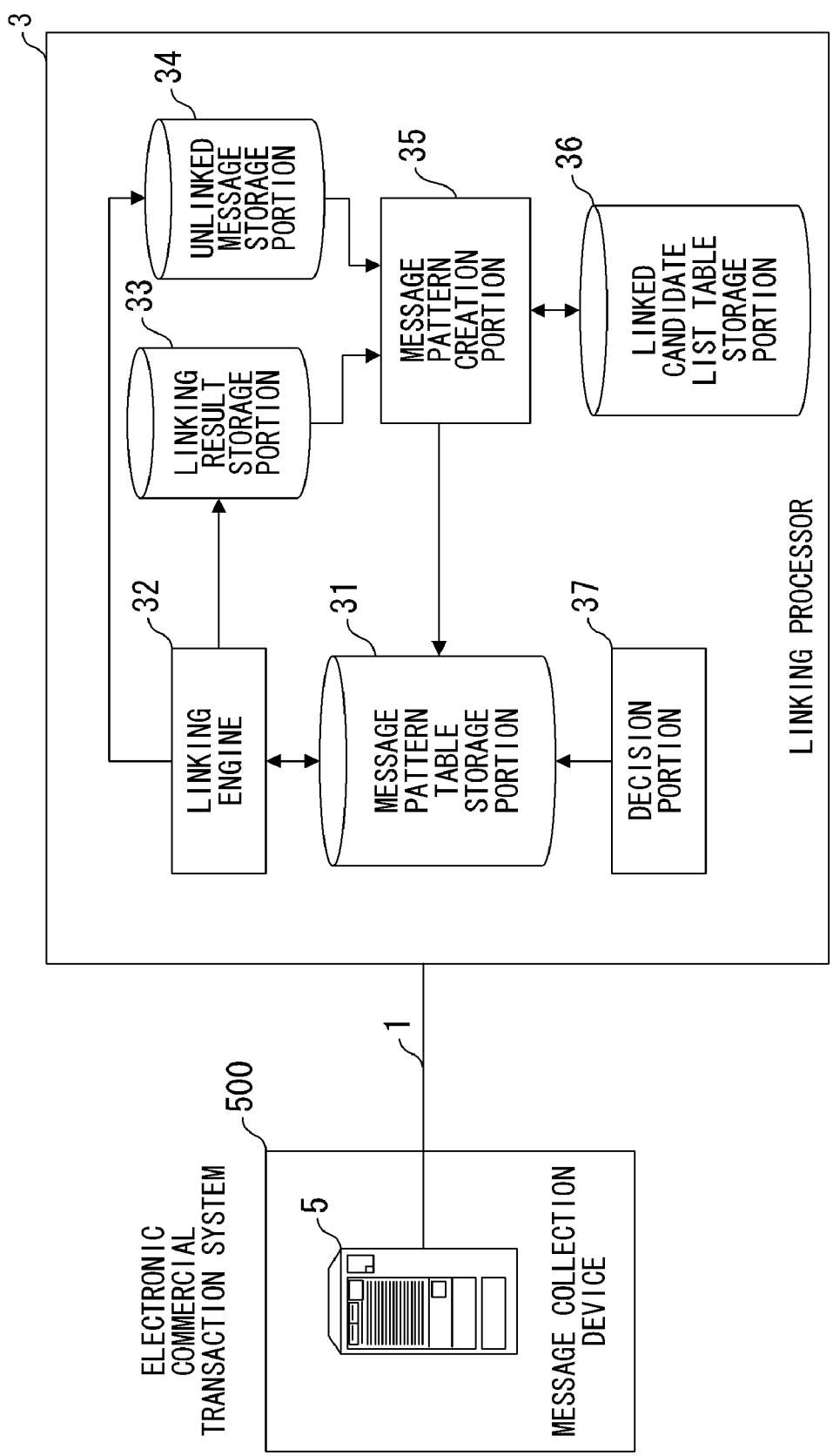
FIG. 5 is a schematic diagram of a system associated with the present embodiment.

FIG. 5 is a block diagram of the system associated with the present embodiment. A linking processor 3 for carrying out main processing of the present embodiment is connected with a message collection device 5, for example, via a network 1 (such as an in-house LAN (local area network)). The message collection device 5 is mounted in an electronic commercial transaction system 500, where various servers (such as web server, application (AP) server, and database (DB) server) are also contained. The collection device 5 collects messages exchanged between these servers. Processing for collecting the messages is similar to the related art processing and thus is not described herein.

The linking processor 3 has a message pattern table storage portion 31 for storing message pattern tables (described later) and a linking engine 32 for performing a linking process using the message received from the message collection device 5 and message patterns stored in the message pattern table storage portion 31. Furthermore, the linking processor 3 has a linking result storage portion 33 for storing the results of the message linking process performed by the linking engine 32 and transaction tables (described later) and an unlinked message storage portion 34 for storing unlinked messages not linked by the message linking process performed by the linking engine 32. In addition, the linking processor 3 has a message pattern creation portion 35 for creating a linked candidate list table (described later) or a message pattern based on the data stored in the linking result storage portion 33 and in the unlinked message storage portion 34 and a linked candidate list table storage portion 36 for storing the linked candidate list table created by the message pattern creation portion 35. Further, the linking processor 3 has a decision portion 37 for periodically checking the message pattern table stored in the message pattern table storage portion 31.

One example of the message pattern table stored in the message pattern table storage portion 31 is shown in FIG. 6. In the example of FIG. 6, the message pattern table contains a string of message pattern IDs, a string of transaction types (TranType), a string of conditions, a string of counters (cnt), a string of spin-off message patterns, a string of associated message patterns, and a string of candidate flags. When a candidate flag is set to 0, confirmation has been made. When the candidate flag is set to 1, there is a candidate. In the string of conditions, conditions regarding the message pattern are set. For example, the first message contains a character string "X=ABC". The last message contains a character string "Y=DEFG". In the string of the counters (cnt), the number of appearances of the message pattern is set. In the string of spin-off message patterns, the pattern IDs of message patterns derived from the present message pattern are set.

Figure 7:
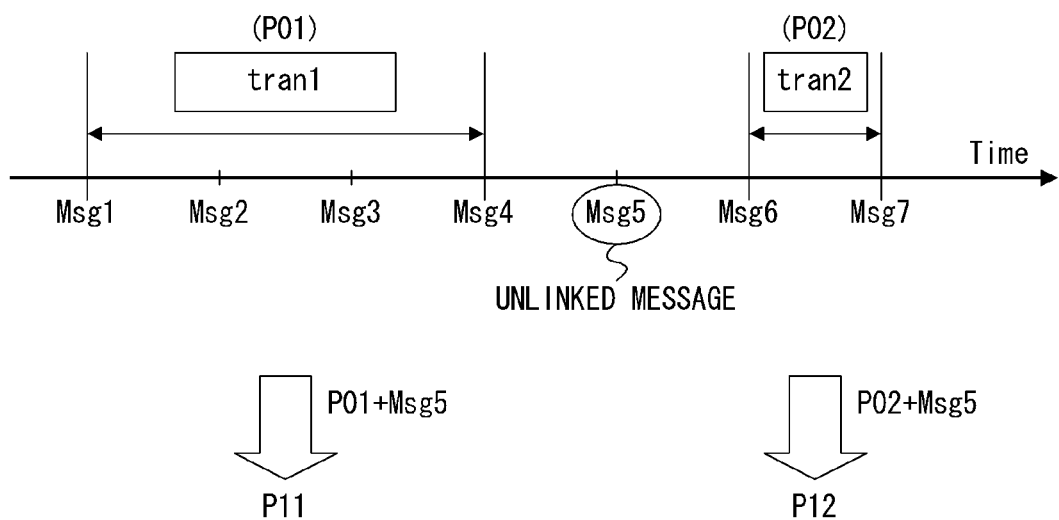
FIG. 7 illustrates associated message patterns.

Referring to FIG. 7, in the present embodiment, if there are an unlinked message (Msg5) and plural transactions (tran1 and tran2) that might be linked, new message patterns (P11 and P12) are created by adding unlinked messages to message patterns P01 and P02, respectively, corresponding to plural transactions that might be linked. The processing for creating the new message patterns is described in detail later. In the present embodiment, in a case where the plural new message patterns are created as described above, message patterns different from one message pattern are referred to as associated message patterns. That is, in the example of FIG. 7, when viewed from the message pattern P11, the message pattern P12 is an associated message pattern. When viewed from the message pattern P12, the message pattern P11 is an associated message pattern. In the string of message associated message patterns, pattern IDs of associated message patterns as described above are set. In the example of FIG. 7, any one of the message patterns P11 and P12 is an actually existing message pattern. The other is a message pattern not existing in practice. Accordingly, in the present embodiment, with respect to a newly created message pattern, the string of candidate flags is set to "1". If real existence of the message pattern has been confirmed, the string of candidate flags is set to "0". Processing for checking whether there is a message pattern in practice is described in detail later.

One example of the transaction table stored in the linking result storage portion 33 is shown in FIG. 8. In the example of FIG. 8, a string of transaction IDs (TranID), a string of transaction start times (T_start), a string of transaction completion times (T_end), a string of linking keywords (Keyword), and a string of the pattern IDs (PatternID) of message patterns are contained in the transaction table. In the string of transaction start times, the time stamp of the first one of messages associated with the transaction is set. In the string of transaction completion times, the time stamp of the last one of the messages associated with the transaction is set. In the string of pattern IDs, the pattern ID of a message pattern which is one of several message patterns stored in the message pattern table and which corresponds to the transaction is set.

One example of the linked candidate list table stored in the linked candidate list table storage portion 36 is shown in FIG. 9. In the example of FIG. 9, a string of the IDs of transactions (TranID), a string (first list) of linked candidates, and another string (second list) of linked candidates are contained in the linked candidate list table. With respect to processing (described later) for creating a linked candidate list table, if a transaction where an unlinked message might be linked is identified uniquely, the message ID of the unlinked message is set in the first list of linked candidates corresponding to a transaction where an unlinked message might be linked. On the other hand, with respect to the processing for creating a linked candidate list table, if there are plural transactions where unlinked messages might be linked, the message IDs of the unlinked messages are set in the second list of linked candidates respectively corresponding to the plural transactions where the unlinked messages might be linked.

Figure 10:
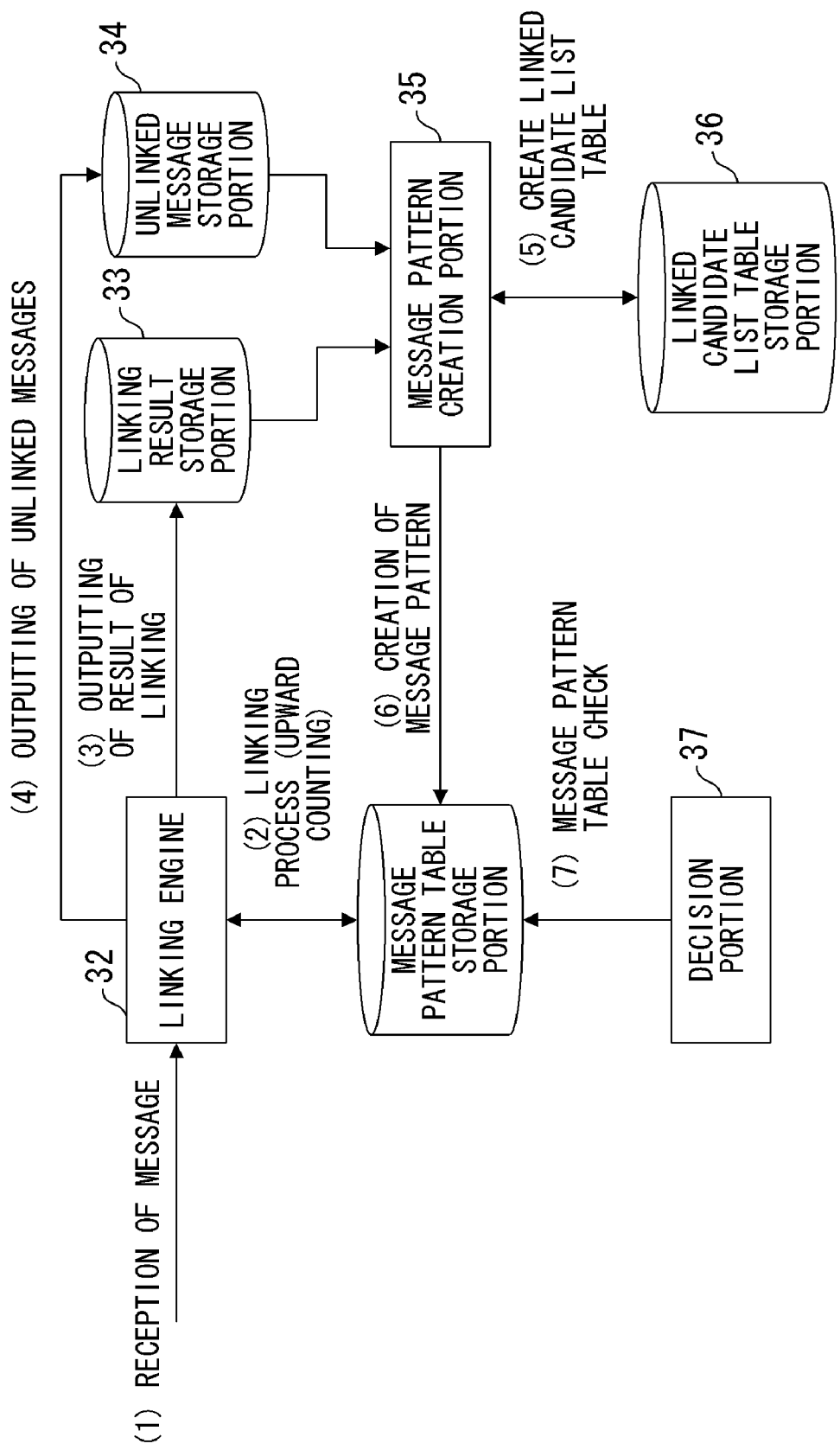
FIG. 10 schematically illustrates processing performed by a linking processor associated with the present embodiment.

The processing performed by the linking processor 3 shown in FIG. 5 is next described briefly by referring to FIG. 10. First, the linking engine 32 successively receives messages from the message collection device 5 (step (1) of FIG. 10). Whenever a message is received from the message collection device 5, the linking engine 32 performs processing for linking the message using the message pattern table (step (2)). If the received message matches any message pattern, the linking engine 32 increments the counter cnt for the message pattern. If it is determined that a full set of messages associated with the transaction has been obtained, the linking engine 32 causes the messages associated with the transaction to be stored as linking results into the linking result storage portion 33 (step (3)). Furthermore, the linking engine 32 adds a record corresponding to the linking results to the transaction table. Additionally, the linking engine 32 causes messages not linked by the message linking process to be stored at given timing as unlinked messages into the unlinked message storage portion 34 (step (4)).

The message pattern creation portion 35 extracts the unlinked messages from the unlinked message storage portion 34 at given timing, refers to the transaction table stored in the linking result storage portion 33, and creates a table of lists of linked candidates. The message pattern creation portion 35 stores the created table of lists of linked candidates into the linked candidate list table storage portion 36 (step (5)). Then, the message pattern creation portion 35 creates a new message pattern based on all of the linked candidate list table, transaction table, and message pattern table and stores the created pattern into the message pattern table storage portion 31 (step (6)).

New message patterns are added and the counter cnt for actually existing message patterns is incremented by repeatedly performing the steps (2) to (6).

The decision portion 37 checks the message pattern table at given timing (step (7)). For example, the decision portion 37 deletes message patterns causing the counter cnt to be set to 0 from the message pattern table. Where there is a message pattern for which the counter cnt is not 0, and an associated message pattern has been set, the decision portion 37 deletes message patterns other than the message pattern that maximizes the value of the counter cnt from among the above-described message patterns and the associated message pattern from the message pattern table. As a result, the message patterns not existing in practice can be deleted from the message pattern table.

Figure 11:
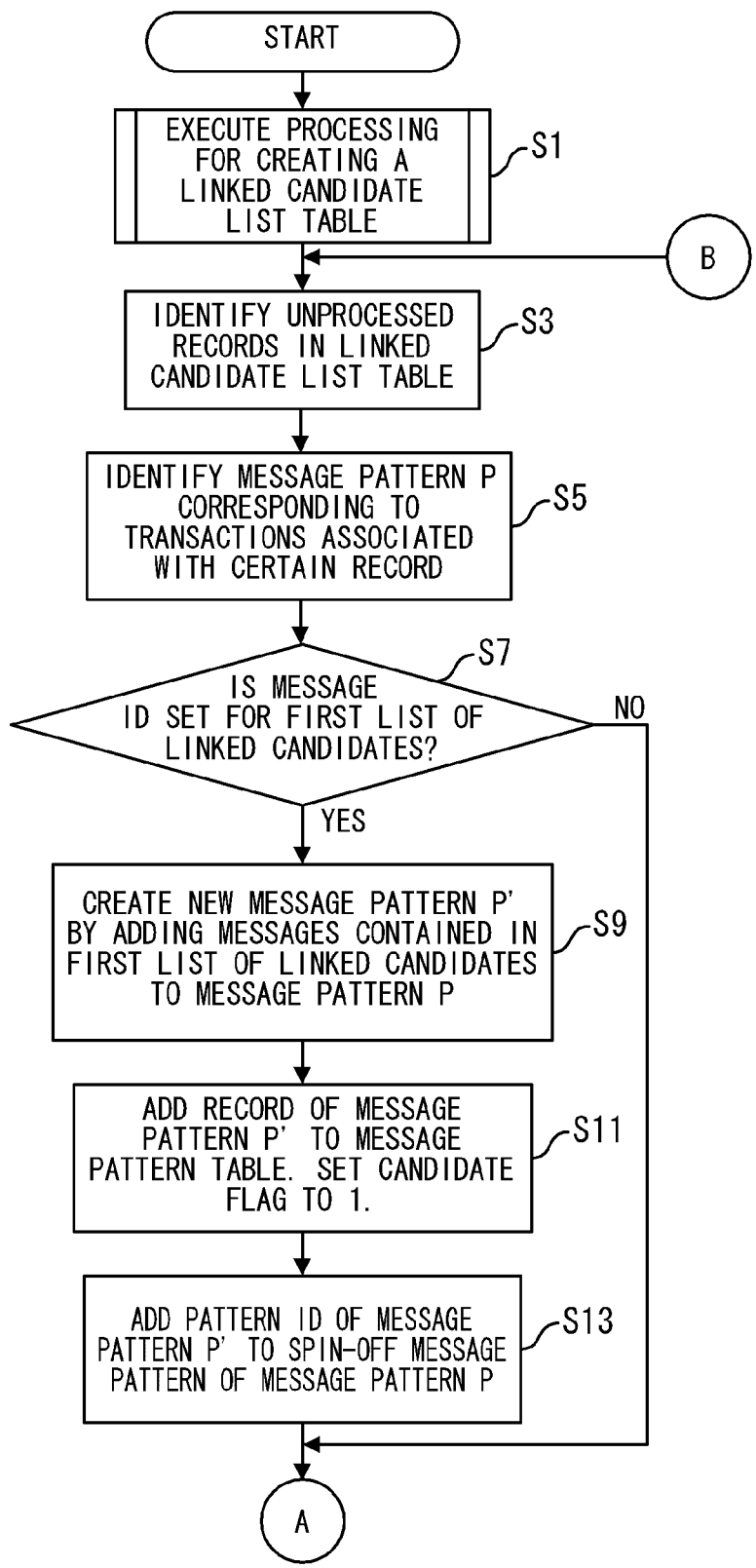
FIG. 11 is a flowchart illustrating a first routine for creating message patterns.
Figure 12:
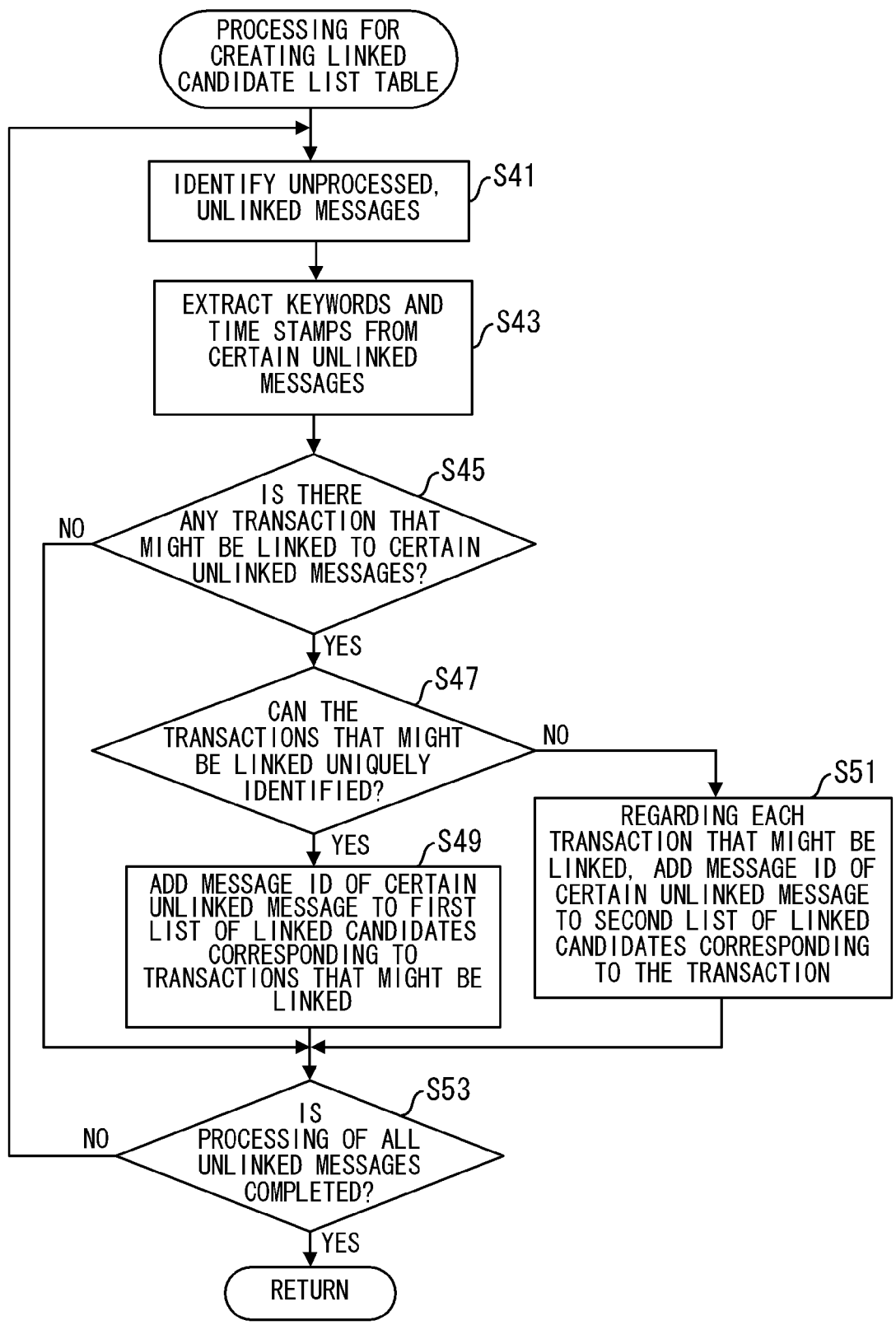
FIG. 12 is a flowchart illustrating processing for creating a table of lists of linked candidates.

The processing to be performed by the linking processor 3 to carry out the processing as illustrated in FIG. 10 is next described in further detail. The steps (5) and (6) illustrated in FIG. 10 are described in further detail by referring to FIGS. 11-18. It is assumed that the transaction table shown in FIG. 8 is stored in the linking result storage portion 33 and that unlinked messages are stored in the unlinked message storage portion 34. The linking processor 3 performs the processing (routine) as illustrated in FIG. 11 periodically or at any arbitrary timings. First, the message pattern creation portion 35 executes processing for creating a linked candidate list table, using data stored in the linking result storage portion 33 and in the unlinked message storage portion 34 (step S1 of FIG. 11).

The processing for creating a linked candidate list table is described by referring to FIGS. 12-15. The message pattern creation portion 35 identifies unlinked messages which are stored in the unlinked message storage portion 34 and which are not yet processed (step S41 of FIG. 12). The message pattern creation portion 35 extracts linking keywords and time stamps from certain unlinked messages and stores them into a memory (step S43).

The message pattern creation portion 35 searches the linking result storage portion 33 based on the extracted linking keyword and makes a decision as to whether there is any transaction that might be linked with the certain unlinked message (step S45). In particular, the message pattern creation portion 35 makes a decision, based on the transaction table and message pattern table, as to whether there is any transaction that is judged to be completely linked by a message pattern for which a candidate flag is set to 0 and which contains a linking keyword identical with the extracted linking keyword. If the decision at step S45 is negative (No), i.e., there is not any such transaction that might be linked with the certain unlinked message, program control goes to step S53.

On the other hand, if the decision at step S45 is affirmative (Yes), i.e., there is a transaction that might be linked to the certain unlinked message, the message pattern creation portion 35 makes a decision as to whether the transaction that might be linked can be identified uniquely (step S47). In particular, the message pattern creation portion 35 makes a decision concerning to which one of the following three cases the current case belongs. If the current case corresponds to the first or second case, it is determined that the transaction that might be linked can be identified uniquely. If the current case corresponds to the third case, it is determined that the transaction that might be linked cannot be identified uniquely.

Figure 13:
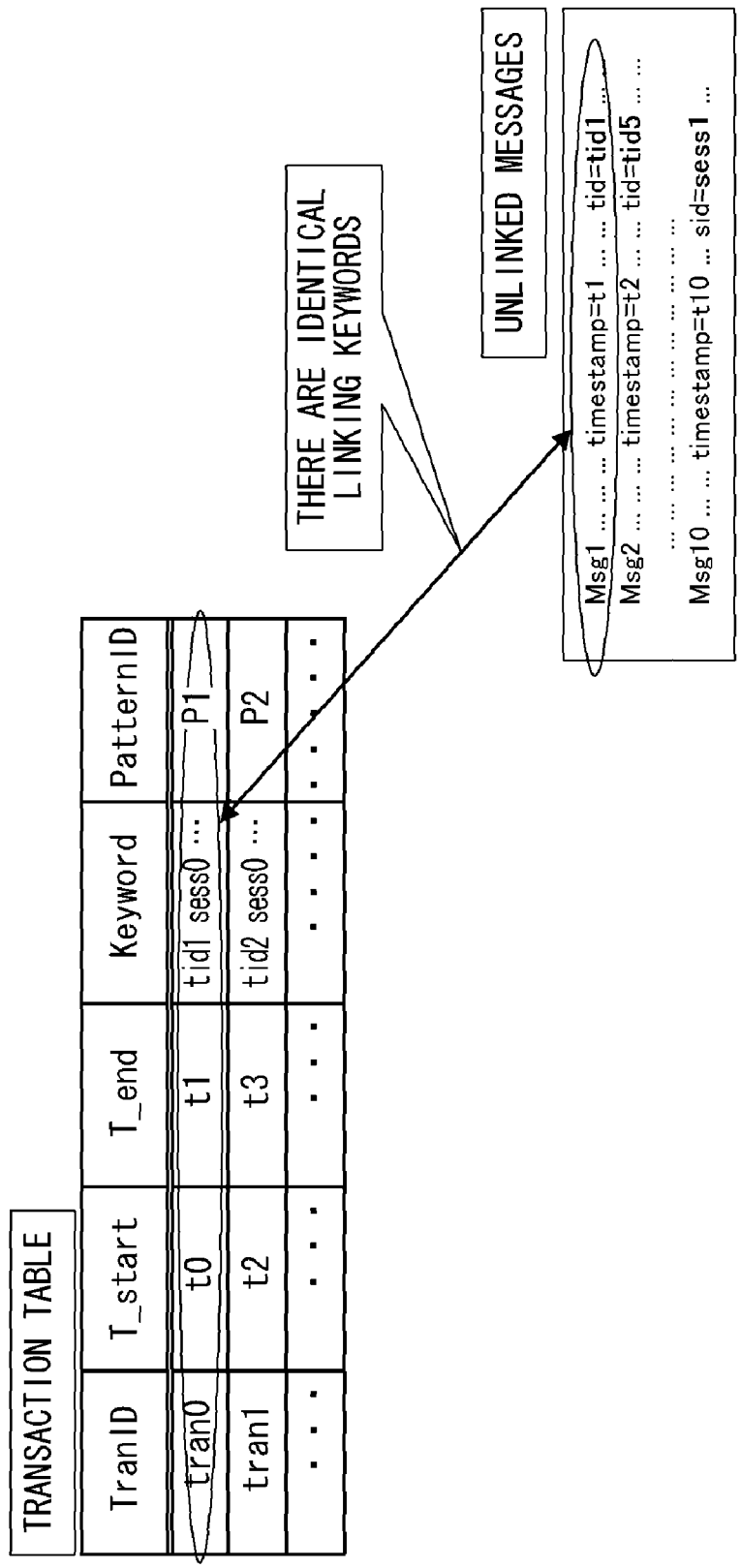
FIG. 13 illustrates a first case in which there is a transaction that might be linked.

In the first case, a transaction that might be linked can be identified uniquely from the linking keyword contained in the unlinked message (Msg1) as shown in FIG. 13. For example, in FIG. 13, linking keyword "tid1" is contained only in the transaction having ID "tran0". The transaction having the ID "tran0" can be uniquely identified as a transaction that might be linked.

Figure 14A:
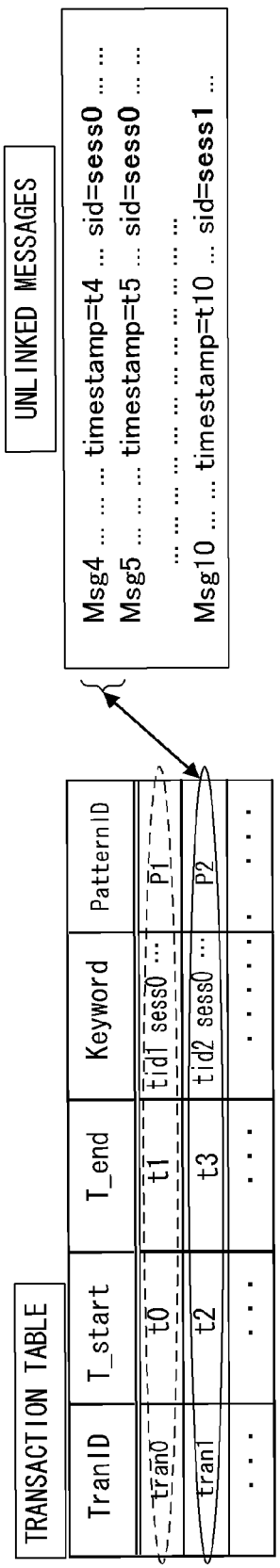
FIG. 14A illustrates a second case in which there is a transaction that might be linked.
Figure 14B:
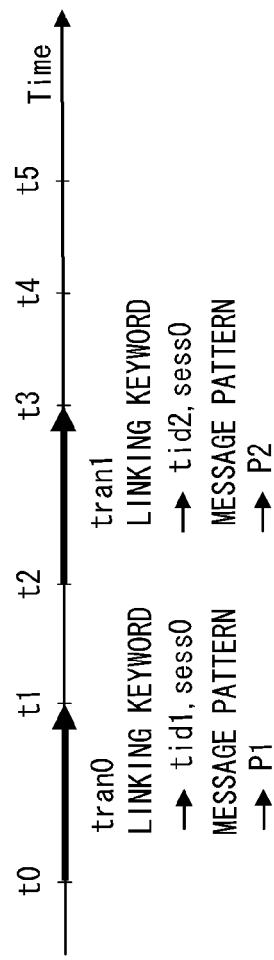
FIG. 14B illustrates the second case in which there is a transaction that might be linked.

In the second case, as shown in FIGS. 14A and 14B, it is impossible to uniquely identify a transaction that might be linked from the linking keywords contained in the unlinked messages (Msg4 and Msg5) but the transaction can be identified uniquely if time stamps are also taken into consideration. For example, in FIG. 14A, linking keyword "sess0" is contained in the transaction having ID "tran0" and in the transaction having ID "tran1" and, therefore, it is impossible to uniquely identify transactions that might be linked. However, comparison of the time stamps of the two transactions shows that the linking keyword "sess0" was a linking keyword of the transaction having ID "tran0" prior to t1 and was a linking keyword of the transaction having ID "tran1" after t2. Because t2<t4<t5 (t4 is the time stamp of Msg4 and t5 is the time stamp of Msg5), the transaction of ID "tran1" can be uniquely identified as a transaction that might be linked.

Figure 15:
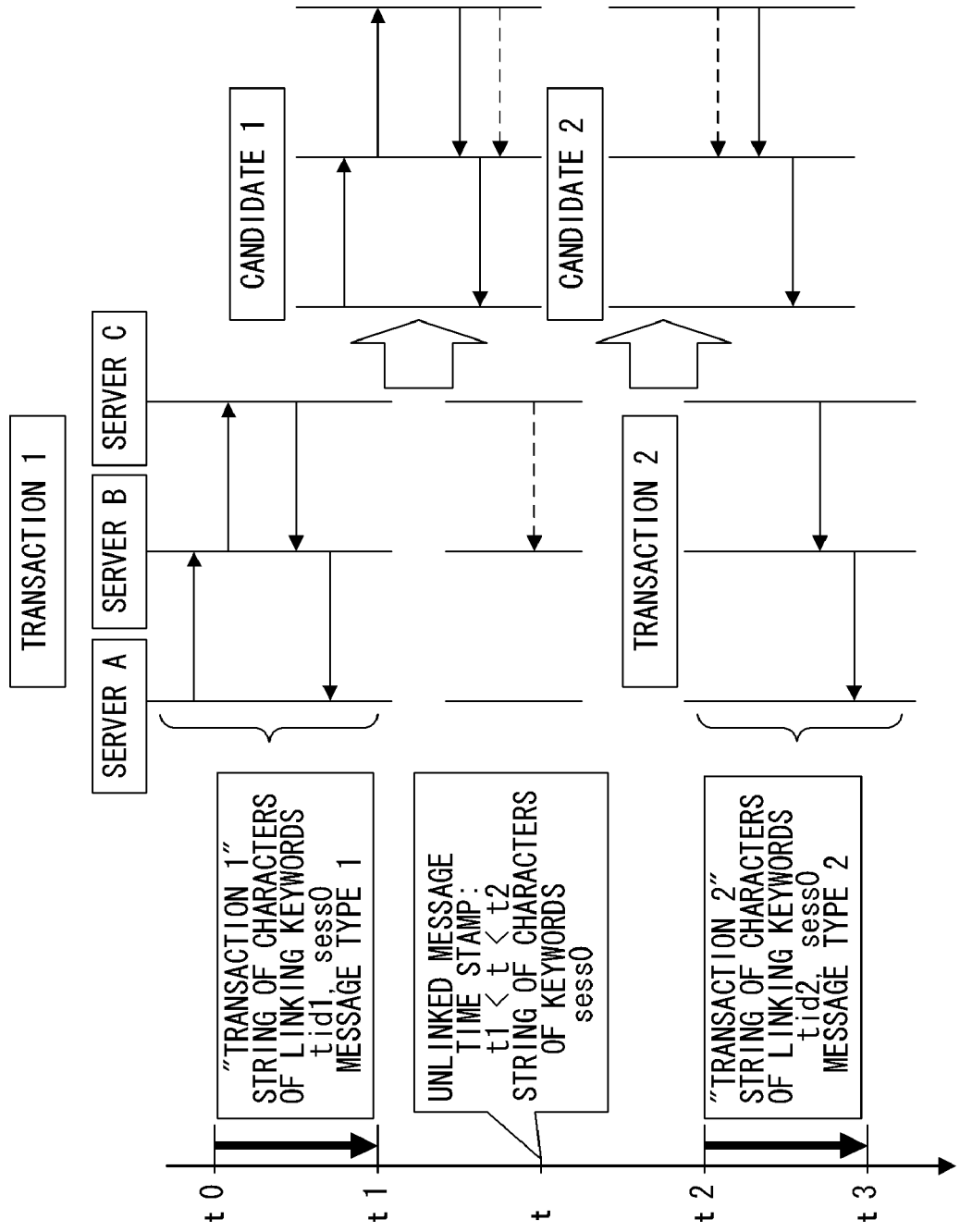
FIG. 15 illustrates a third case in which there is a transaction that might be linked.

In the third case, it is impossible to uniquely identify a transaction that might be linked even if the time stamp is taken into consideration as shown in FIG. 15. For example, in the case of FIG. 15, the linking keyword "sess0" is contained in the transaction having ID "tran0" and in the transaction having ID "tran1" and, therefore, a transaction that might be linked cannot be identified uniquely. Furthermore, during the interval from t1 to t2, it is impossible to identify to which one of the transactions the linking keyword "sess0" belongs. Because the relationship t1<t<t2 (where t is the time stamp of an unlinked message) holds in this case, it is judged that both the transaction having the ID "tran0" and the transaction having the ID "tran1" might be linked.

If the decision at step S47 is Yes (i.e., a transaction that might be linked can be identified uniquely), the message pattern creation portion 35 adds the message ID of a certain unlinked message to the first list of linked candidates corresponding to transactions that might be linked (step S49). If any record associated with a transaction that might be linked is not yet stored in the linked candidate list table, the message pattern creation portion 35 adds records associated with transactions that might be linked to the linked candidate list table and then adds the message ID to the first list of linked candidates. Program control then proceeds to step S53.

If the decision at step S47 is No (i.e., it is impossible to uniquely identify a transaction that might be linked), the message pattern creation portion 35 adds the message ID of the certain unlinked message to the second list of linked candidates corresponding to the transaction for each transaction that might be linked (step S51). Unless any record associated with a transaction that might be linked is stored in the linked candidate list table, the message pattern creation portion 35 adds the record associated with the transaction that might be linked to the linked candidate list table and then adds the message ID to the second list of linked candidates. Program control then goes to step S53.

The message pattern creation portion 35 then makes a decision as to whether the processing of all unlinked messages has been completed (step S53). If the decision at step S53 is No (i.e., the processing of all unlinked messages is not completed), program control returns to step S41. On the other hand, if the decision at step S53 is Yes (i.e., the processing of all unlinked messages is completed), the present routine is terminated. Program control returns to the main routine.

Referring back to FIG. 11, the message pattern creation portion 35 identifies unprocessed records contained in the linked candidate list table (step S3). The message pattern creation portion 35 searches the transaction table based on the TranID contained in the certain record and identifies the message pattern P corresponding to the transaction associated with the certain record (step S5). The message pattern creation portion 35 makes a decision as to whether the message ID is set in the first list of linked candidates in the certain record (step S7). If the decision at step S7 is No (i.e., the message ID is not set in the first list of linked candidates in the certain record), the message pattern creation portion 35 goes to step S15 (FIG. 16) via an exit point A.

On the other hand, if the decision at step S7 is Yes (i.e., a message ID is set in the first list of linked candidates in the certain record), the message pattern creation portion 35 adds the message contained in the first list of linked candidates to the message pattern P to thereby create a new message pattern P' (step S9). The message pattern creation portion 35 adds a record of the message pattern P' to the message pattern table and sets the candidate flag to 1 (there is a candidate) (step S11). For example, it is assumed that the condition of the message pattern P is that the first message contains a character string "X=ABC" and the last message contains a character string "Y=DEFG". It is also assumed that an unlinked message (assumed to contain a character string "Y=HIJ") is added to the end of the message pattern P, and the message pattern P' is created. In this case, the condition of the newly created message pattern P' is that the first message contains a character string "X=ABC", an intermediate message contains a character string "Y=DEFG", and the last message contains a character string "Y=HIJ". The message pattern creation portion 35 adds the pattern ID of the message pattern P' to the spin-off message pattern in the record of the message pattern P in the message pattern table (step S13). Program control goes to step S15 (FIG. 16) via the exit point A.

Figure 16:
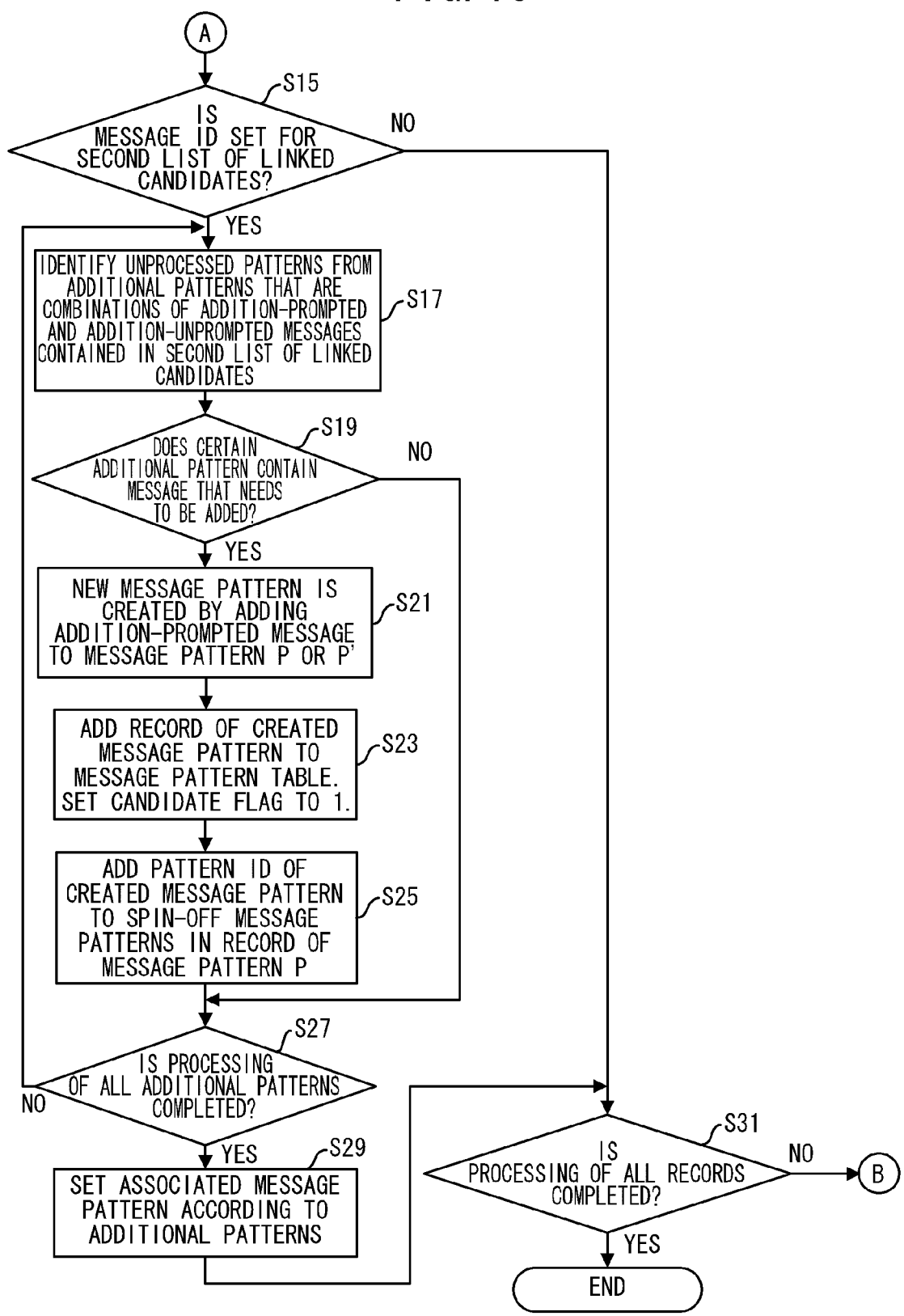
FIG. 16 is a flowchart illustrating a second routine for creating message patterns.

Referring next to FIG. 16, after passing through the exit point A, the message pattern creation portion 35 makes a decision as to whether a message ID is set in the second list of linked candidates in the certain record (step S15 of FIG. 16). If the decision at step S15 is No (i.e., no message ID is set in the second list of linked candidates in the certain record), program control proceeds to step S31.

On the other hand, if the decision at step S15 is Yes (i.e., a message ID is set in the second list of linked candidates in the certain record), the message pattern creation portion 35 identifies unprocessed patterns from additional patterns each of which is a combination of addition-prompted and addition-unprompted messages contained in the second list of linked candidates (step S17). The additional patterns are now described by referring to FIGS. 17 and 18.

Figure 17:
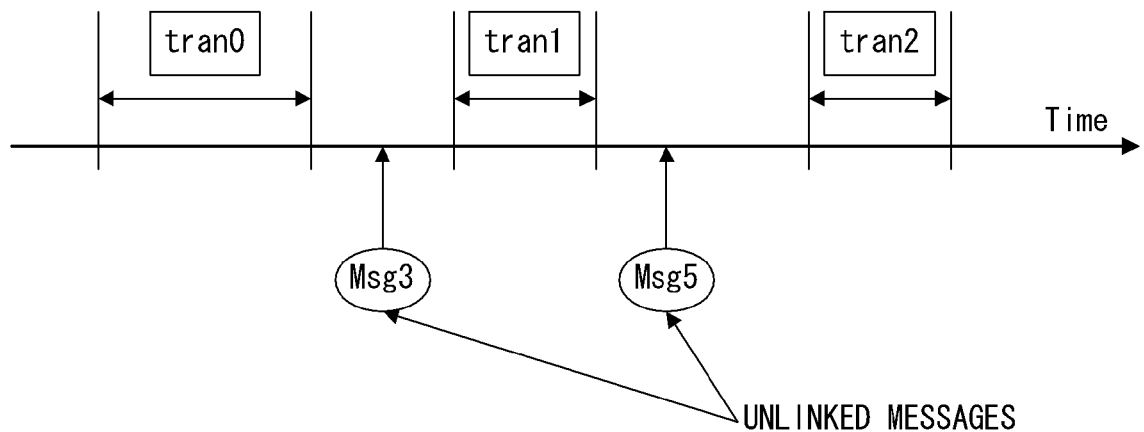
FIG. 17 illustrates additional patterns.
Figure 18:
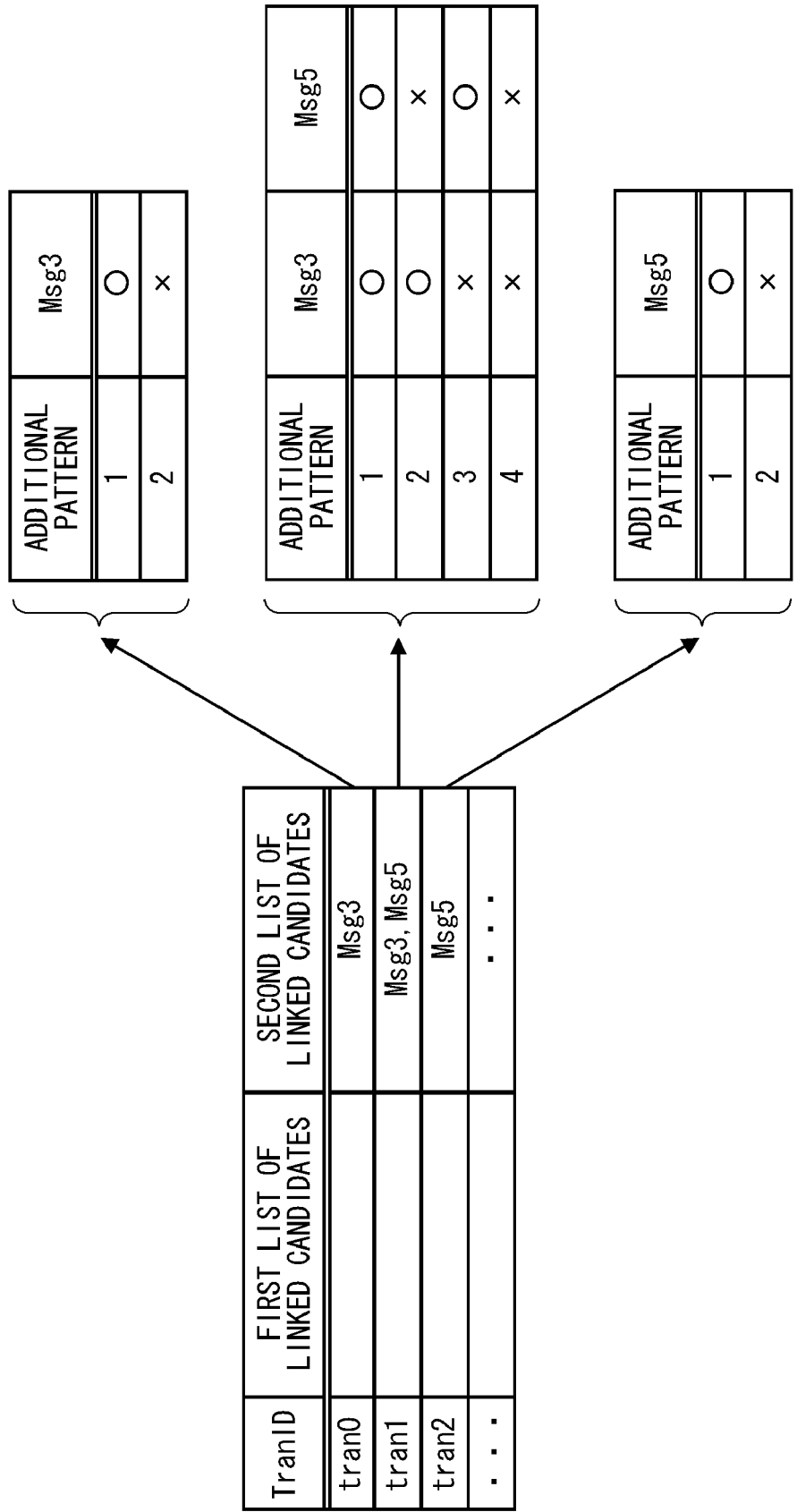
FIG. 18 illustrates further additional patterns.
Figure 19:
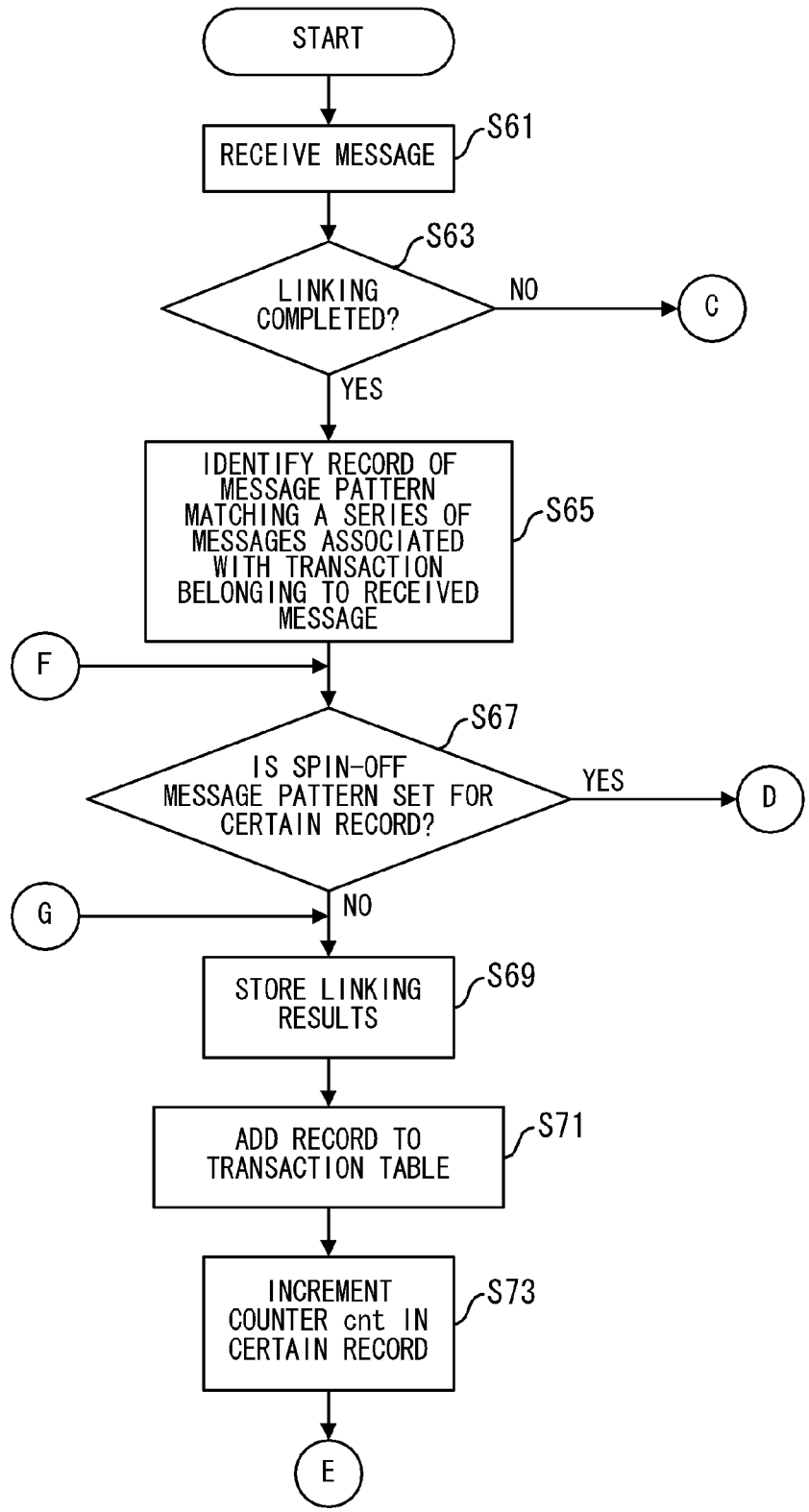
FIG. 19 is a flowchart illustrating a first routine included in a message linking process.

As an example, as shown in FIG. 17, it is assumed that there are two unlinked messages (Msg3 and Msg5), the message Msg3 might be linked to two transactions having IDs of "tran0" and "tran1", respectively, and the message Msg5 might be linked to two transactions having IDs of "tran1" and "tran2", respectively. In this case, if the processing for creating a table of lists of linked candidates is performed, the table of lists of linked candidates as shown in FIG. 18 is created. In the table of lists of linked candidates of FIG. 18, the message Msg3 is set in the second list of linked candidates in a record of TranID "tran0". The messages Msg3 and Msg5 are set in the second list of linked candidates in a record of TranID "tran1". The message Msg5 is set in the second list of linked candidates of a record of TranID "tran2". An additional pattern corresponding to each record is similarly structured as shown in FIG. 18. In FIG. 18, additional patterns corresponding to a record having TranID "tran0" are two in type. Additional patterns corresponding to a record having TranID "tran1" are four in type. Additional patterns corresponding to a record having TranID "tran2" are two in type. In FIG. 18, if O is set, it is meant that a message is added. If x is set, it is meant that no message is added. A message for which O is set is hereinafter referred to as a message that needs to be added or simply as a message to be added.

The message pattern creation portion 35 makes a decision as to whether the certain additional patterns contain messages that need to be added (step S19). If the decision at step S19 is No (i.e., the certain additional patterns contain no messages that need to be added), program control proceeds to step S27.

On the other hand, if the decision at step S19 is Yes (i.e., the certain additional patterns contain messages that need to be added), the message pattern creation portion 35 creates new message patterns by adding the messages to be added either to the message pattern P or to the message pattern P' (step S21). In step S21, in a case where a message ID is set in the first list of linked candidates in the certain record, the message pattern creation portion 35 creates a new message pattern based on the message pattern P' created in step S9 (FIG. 11). Unless a message ID is set in the first list of linked candidates in the certain record, the message pattern creation portion 35 creates a new message pattern based on the message pattern P identified in step S5 (FIG. 11). The message pattern creation portion 35 adds a record of the newly created message pattern to the message pattern table and sets the candidate flag to 1, indicating presence of a candidate (step S23). Furthermore, the message pattern creation portion 35 adds the pattern ID of the newly created message pattern to a spin-off message pattern in the record of the message pattern P in the message pattern table (step S25).

The message pattern creation portion 35 makes a decision as to whether processing about all additional patterns is completed (step S27). If the decision at step S27 is No (i.e., the processing about all the additional patterns is not completed), program control returns to step S17. On the other hand, if the decision at step S27 is Yes (i.e., the processing about all the additional patterns is completed), the message pattern creation portion 35 sets an associated message pattern according to the additional patterns (step S29). The processing is described while taking an additional pattern corresponding to TranID "tran1" shown in FIG. 18 as an example. A message pattern created according to additional pattern 1 (i.e., by adding the messages Msg3 and Msg5) is referred to as new pattern 1. A message pattern created according to additional pattern 2 (i.e., by adding the message Msg3) is referred to as new pattern 2. A message pattern created according to additional pattern 3 (i.e., by adding the message Msg5) is referred to as new pattern 3. The new patterns 1 and 2 have been created by adding the message Msg3. When viewed from the new pattern 1, the new pattern 2 is an associated message pattern. When viewed from the new pattern 2, the new pattern 1 is an associated message pattern. Accordingly, in the message pattern table, the new pattern 2 is set in the associated message pattern in the record of the new pattern 1. The new pattern 1 is set in the associated message pattern in the record of the new pattern 2. The new patterns 1 and 3 have been created by adding the message Msg5. When viewed from the new pattern 1, the new pattern 3 is an associated message pattern. When viewed from the new pattern 3, the new pattern 1 is an associated message pattern. Accordingly, in the message pattern table, the new pattern 3 is set in the associated message pattern in the record of the new pattern 1. The new pattern 1 is set in the associated message pattern in the record of the new pattern 3.

Then, the message pattern creation portion 35 makes a decision as to whether the processing about all the records in the table of the lists of linked candidates is completed (step S31). If the decision at step S31 is No (i.e., the processing about all the records in the table of the lists of linked candidates is not completed), program control returns to step S3 (FIG. 11) via an exit point B. On the other hand, if the decision at step S31 is Yes (i.e., the processing about all the records in the table of the lists of linked candidates is completed), the routine is terminated.

New message patterns can be created based on already defined message patterns by performing the processing described so far.

The processing of FIG. 10 starting with step (1) and ending with step (3) is next described in detail by referring to FIGS. 19-22. First, the linking engine 32 receives a message from the message collection device 5 (step S61 of FIG. 19). The linking engine 32 makes a decision, based on the message patterns stored in the message pattern table, as to whether the linking process is completed (step S63). More specifically, the linking engine 32 compares a series of messages associated with a transaction to which the received message belongs with each message pattern stored in the message pattern table. A decision is made, using the received message, as to whether the series of messages associated with the transaction to which the received message belongs matches any message pattern stored in the message pattern table. If the decision at step S63 is No (i.e., the linking process is not completed), the routine is terminated through an exit point C.

On the other hand, if the decision at step S63 is Yes (i.e., the linking process is completed), the linking engine 32 identifies a record of the message pattern matching the series of messages associated with the transaction to which the received message belongs in the message pattern table (step S65). The linking engine 32 makes a decision as to whether a spin-off message pattern is set in the certain record (step S67). If the decision at step S67 is Yes (i.e., a spin-off message pattern is set in the certain record), program control goes to step S83 (FIG. 22) via an exit point D.

On the other hand, if the decision at step S67 is No (i.e., no spin-off message pattern is set in the certain record), the linking engine 32 causes a message associated with the transaction to which the received message belongs to be stored as linking results into the linking result storage portion 33 (step S69). Then, the linking engine 32 adds a record corresponding to the linking results to the transaction table (step S71). The linking engine 32 sets the time stamp of the message that is first in the linking results at the transaction start time (T_start) of the record, and sets the time stamp of the message that is last in the linking results at the transaction completion time (T_end). The linking engine 32 sets a linking keyword associated with the linking results in the linking keyword (Keyword) for the record. The linking engine 32 once stores the linking keyword into a storage device. It is assumed that at least a linking keyword associated with the previous linking results is stored in the storage device. The linking engine 32 increments the counter cnt in the certain record (step S73). Program control goes to step S75 (FIG. 20) via an exit point E.

Figure 20:
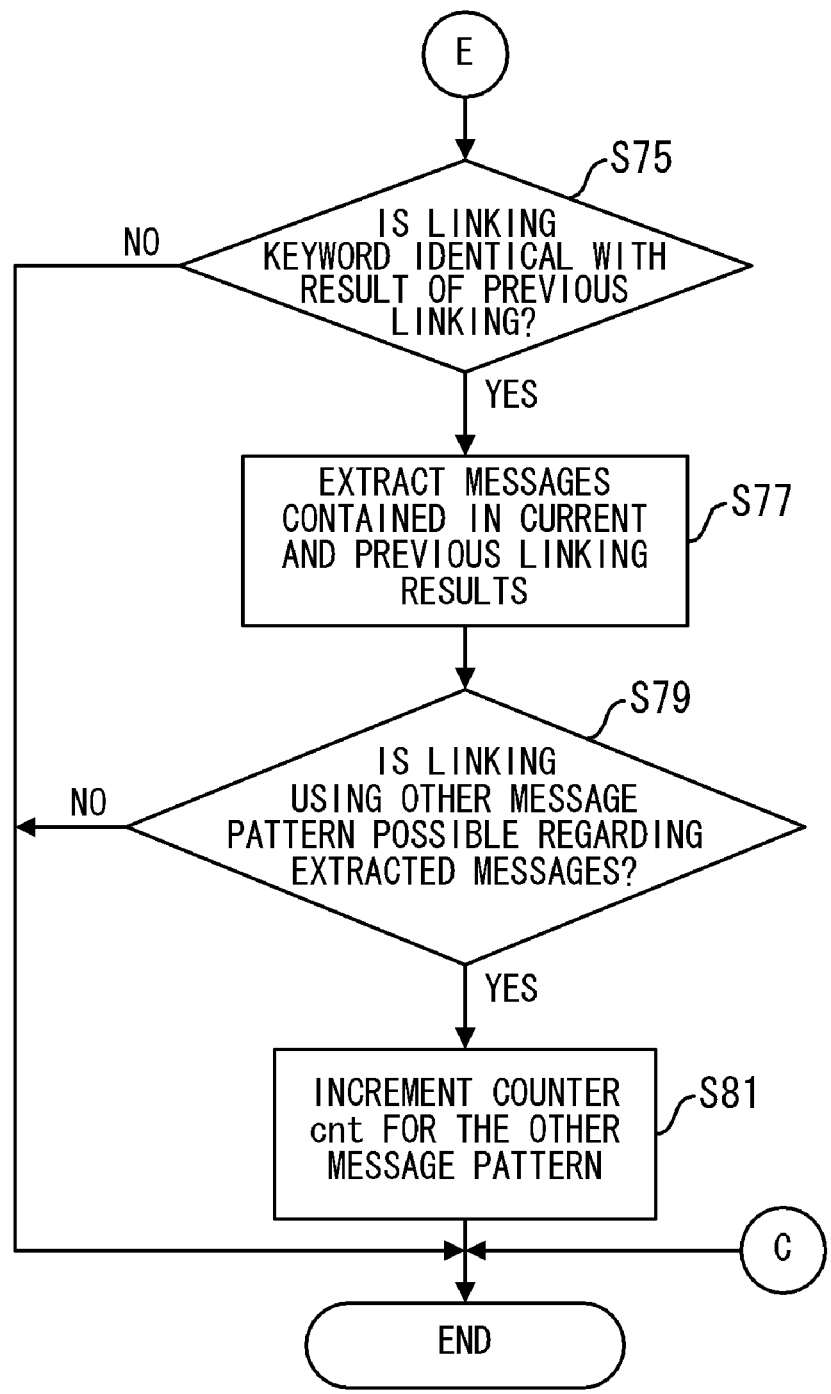
FIG. 20 is a flowchart illustrating a second routine included in the message linking process.

Referring to FIG. 20, after passing through the exit point E, the linking engine 32 makes a decision as to whether the linking keyword is identical with the linking keyword associated with the previous linking results (step S75 of FIG. 20). If the decision made at step S75 by the linking engine 32 is No (i.e., the linking keyword is not identical with the linking keyword associated with the previous linking results), the processing is terminated.

Figure 21:
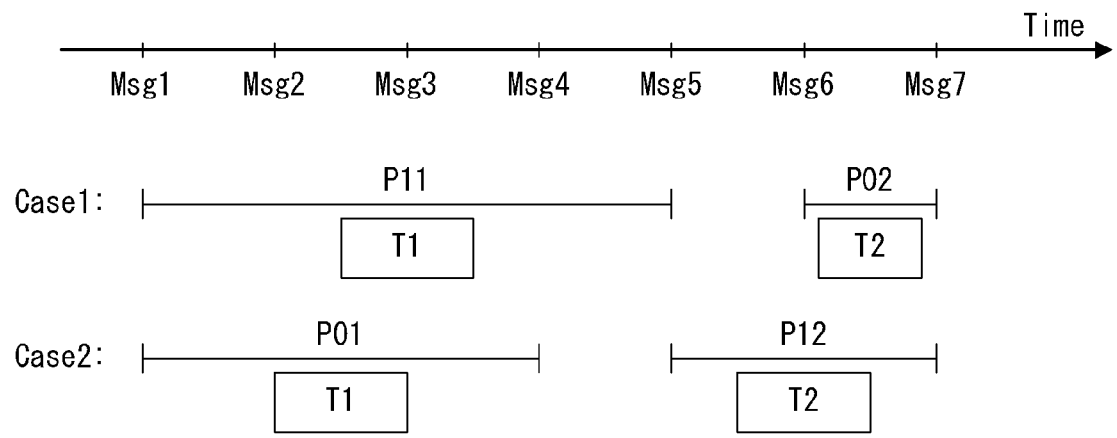
FIG. 21 illustrates processing performed to make a decision as to whether linking is possible using other message patterns.

On the other hand, if the decision at step S75 is Yes (i.e., the linking keyword is identical with the linking keyword associated with the previous linking results), the linking engine 32 extracts messages contained in the present linking results and in the previous linking results from the linking result storage portion 33 and once stores the extracted messages into the storage device (step S77). Then, the linking engine 32 makes a decision as to whether the extracted messages can be linked using other message patterns (step S79). For example, it is assumed that the message pattern table shown in FIG. 6 is stored in the message pattern table storage portion 31 and that P01, P02, P11, and P12 are defined as Msg1-Msg4, Msg6-Msg7, Msg1-Msg5, and Msg5-Msg7, respectively. Where the linking engine 32 receives messages Msg1 to Msg7 in turn as shown in FIG. 21, the linking engine 32 judges that Msg1-Msg5 and Msg6-Msg7 match P11 and P02, respectively. The linking engine 32 treats Msg1-Msg5 as transaction 1 (T1), treats Msg6-Msg7 as transaction 2 (T2), and stores them in the linking results (Case 1). However, where the linking keyword associated with the transaction 1 is identical with the linking keyword associated with the transaction 2, linking can be done while treating Msg1-Msg4 as the transaction 1 and Msg5-Msg7 as the transaction 2 using P01 and P12 as also shown in FIG. 21 (Case 2). In step S79, a decision is made as to whether linking can be done using such another message pattern.

If the decision at step S79 is Yes (i.e., the extracted messages can be linked using other message pattern), the linking engine 32 increments the counter cnt for the other message pattern (step S81). In the above example, the counters cnt for P01 and P12 are incremented. The counters cnt for P11 and P02 are incremented in step S73. As a result, the counters cnt for P01, P02, P11, and P12 are incremented.

On the other hand, if the decision at step S79 is No (i.e., the extracted messages cannot be linked using the other message pattern), the processing is terminated.

Figure 22:
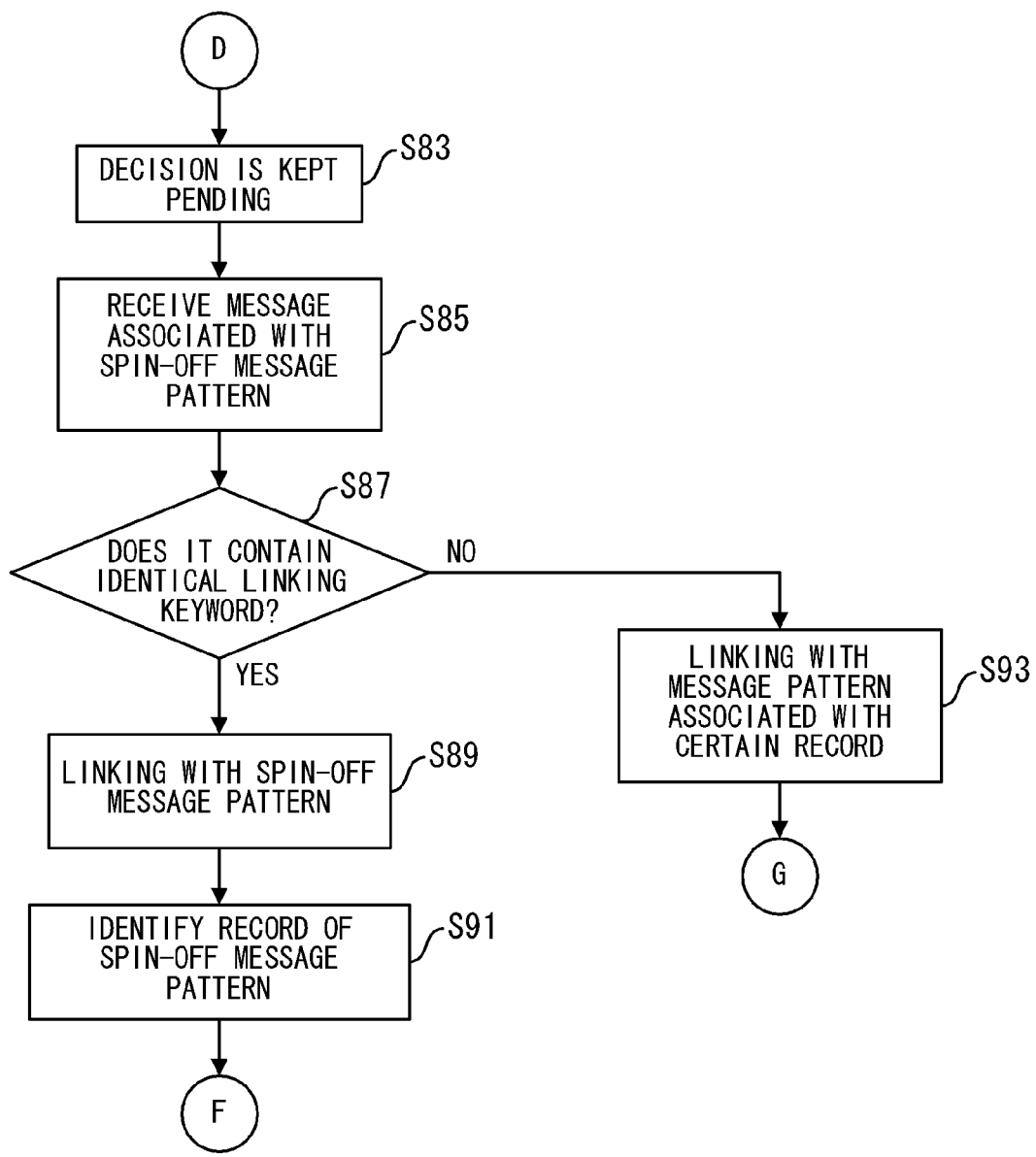
FIG. 22 is a flowchart illustrating a third routine included in the message linking process.

Processing (i.e., processing performed after program control passes through the exit point D) performed when the decision at step S67 (FIG. 19) is that a spin-off message pattern is set in a certain record is described by referring to FIG. 22. If the decision is that a spin-off message pattern is set in the certain record, the linking engine 32 keeps pending the decision about completion of linking (step S83 of FIG. 22). That is, where a series of messages associated with a transaction matches any message pattern, if there is a message pattern derived from the message pattern, then there is a possibility that a match with the spin-off message pattern occurs. Therefore, the linking engine 32 does not regard the transaction as completion of linking but keeps the transaction pending until a message associated with the spin-off message pattern is received. For example, when a series of messages associated with a transaction matches P01 (Msg1-Msg4), if P11 (Msg1-Msg5) derived from P01 is present, the decision is kept pending until the message Msg5 is received.

Then, the linking engine 32 receives a message associated with a spin-off message pattern from the message collection device 5 (step S85). The linking engine 32 makes a decision as to whether the message received in step S85 contains a linking keyword identical with the linking keyword associated with the pending transaction (step S87). If the decision at step S87 is Yes (i.e., the message received in step S85 contains a linking keyword identical with the linking keyword associated with the pending transaction), the linking engine 32 determines that linking using the spin-off message pattern is completed (step S89). The linking engine 32 then identifies a record of the spin-off message pattern in the message pattern table (step S91) and returns to step S67 (FIG. 19) via an exit point F.

On the other hand, if the decision at step S87 is No (i.e., the message received in step S85 does not contain any linking keyword identical with the linking keyword associated with the pending transaction), the linking engine 32 determines that linking using the message pattern associated with the certain record is completed (step S93). Program control returns to step S69 (FIG. 19) via an exit point G.

A message linking process can be performed appropriately by carrying out the processing as described so far, even if a new message pattern is created from some message pattern.

Figure 23:
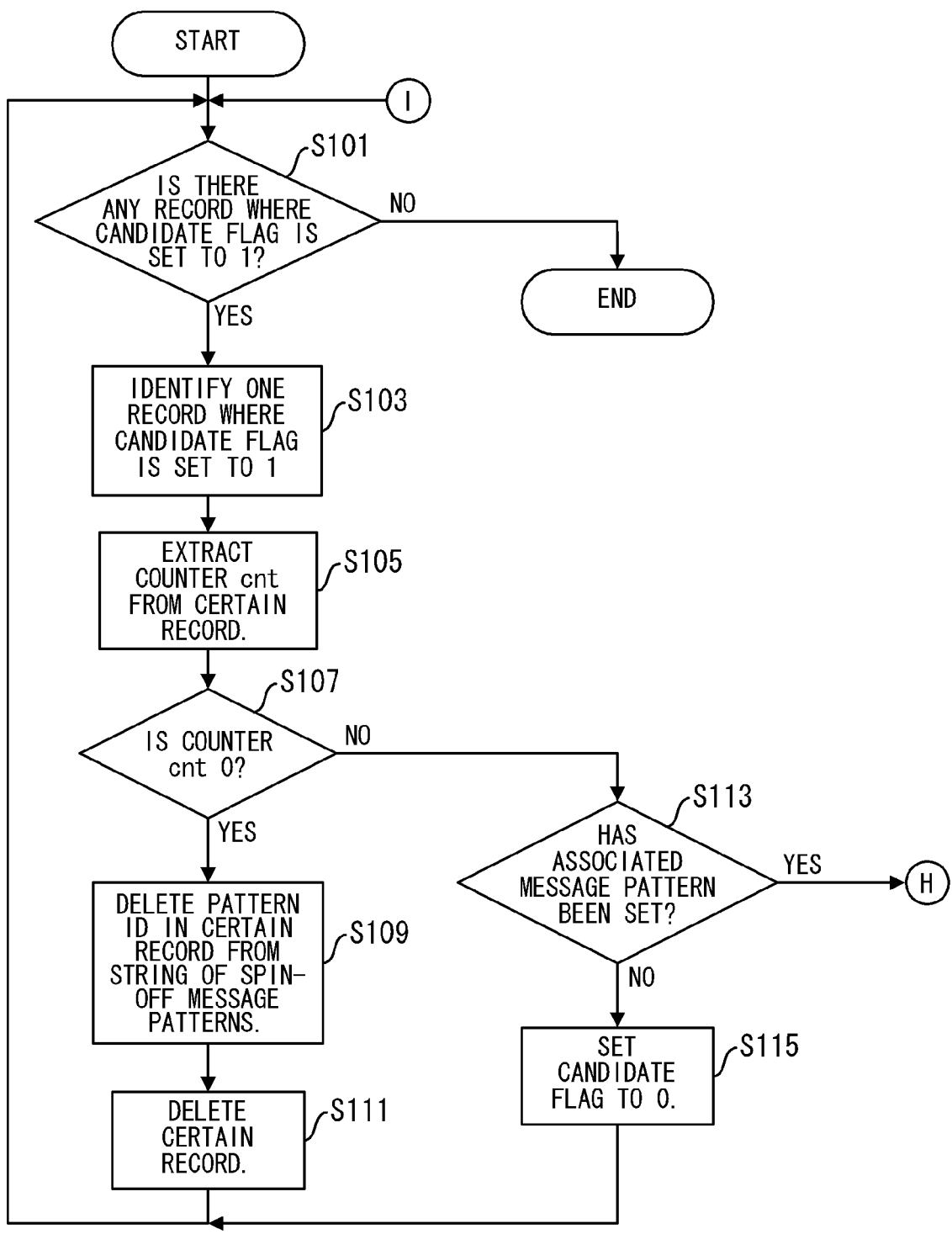
FIG. 23 is a flowchart illustrating a first routine included in processing for checking message pattern tables.
Figure 24:
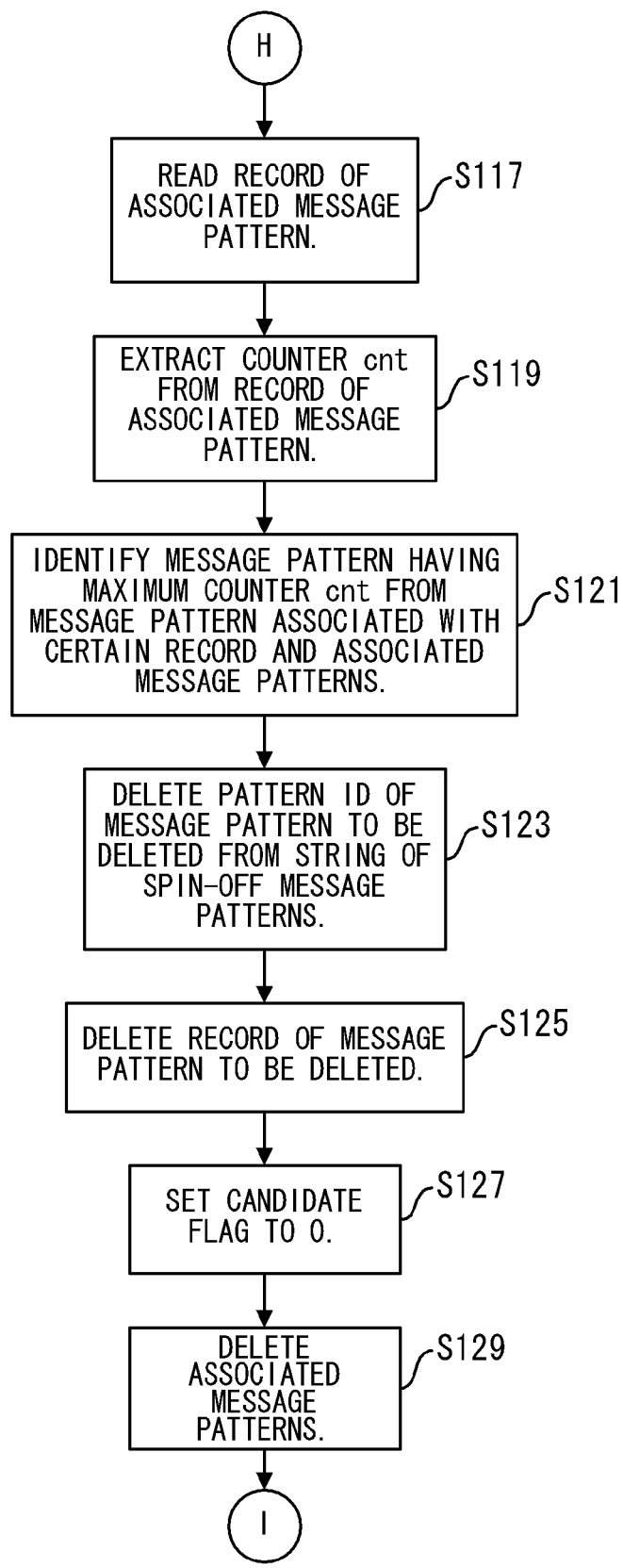
FIG. 24 is a flowchart illustrating a second routine included in the processing for checking message pattern tables.

The processing of step (7) illustrated in FIG. 10 is next described in detail by referring to FIGS. 23-25. It is assumed that the message pattern table shown in FIG. 6 is stored in the message pattern table storage portion 31. The linking processor 3 executes processing as illustrated in FIG. 23 periodically or at any arbitrary timings. First, the decision portion 37 makes a decision as to whether there is a record having a candidate flag set to 1 in the message pattern table (step S101 of FIG. 23). If the decision at step S101 is No (i.e., there is not any record having a candidate flag set to 1 in the message pattern table), the processing is terminated.

On the other hand, if the decision at step S101 is Yes (i.e., there is a record having a candidate flag set to 1 in the message pattern table), the decision portion 37 identifies one record having a candidate flag set to 1 in the message pattern table (step S103). The decision portion 37 extracts the counter cnt from a certain record (step S105) and makes a decision as to whether or not the value of the counter cnt is 0 (step S107). If the decision at step S107 is Yes (i.e., the value of the counter cnt is judged to be 0), the decision portion 37 deletes the pattern ID associated with the certain record from a string of spin-off message patterns in the message pattern table (step S109). The decision portion 37 deletes the certain record from the message pattern table (step S111). That is, the decision portion 37 regards a message pattern making the counter cnt have a value of 0 as a message pattern not present in practice and deletes the message pattern from the message pattern table.

On the other hand, if the decision at step S107 is No (i.e., the value of the counter cnt is judged to be nonzero), the decision portion 37 makes a decision as to whether an associated message pattern is set in the certain record (step S113). If the decision at step S113 is No (i.e., any associated message pattern is not set in the certain record), the decision portion 37 determines that a message pattern associated with the certain record exists in practice and sets the candidate flag for the certain record to 0 (step S115).

On the other hand, if the decision at step S113 is Yes (i.e., an associated message pattern is set in the certain record), the decision portion 37 proceeds to step S117 (FIG. 24) via an exit point H.

Referring next to FIG. 24, after passing through the exit point H, the decision portion 37 reads the record of the associated message pattern in the message pattern table (step S117). Where plural associated message patterns are set, the decision portion 37 reads the records of the associated message patterns. The decision portion 37 extracts the counter cnt from the record of the associated message pattern (step S119). Then, the decision portion 37 identifies a message pattern for which the corresponding counter cnt has a maximum value out of the message pattern associated with the certain record and associated message patterns (step S121). Among the group of the message patterns associated with the certain record and the associated message patterns, the message patterns other than the certain message pattern are hereinafter referred to as "message patterns to be deleted". The decision portion 37 deletes the pattern IDs of the message patterns to be deleted from a string of spin-off message patterns in the message pattern table (step S123). The decision portion 37 deletes the records of the message patterns to be deleted from the message pattern table (step S125). The decision portion 37 determines that the certain message pattern is present in practice and sets the candidate flag of the record of the certain message pattern to 0 (step S127). The decision portion 37 deletes the associated message patterns from the record of the certain message pattern (step S129). Program control returns to step S101 (FIG. 23) via an exit point I.

When the processing illustrated in FIGS. 23 and 24 is performed, the message pattern table shown in FIG. 6 is transformed into data as shown in FIG. 25. In FIG. 6, P12 is set as an associated message pattern in the record of P11. Comparison of the value of the counter cnt of P11 and the value of the counter cnt of P12 shows that the counter cnt of P11 is greater in value. Therefore, in FIG. 25, the record of P12 has been deleted. Furthermore, in FIG. 25, the candidate flag of the record of P11 is updated to 0. The spin-off message pattern (P12) is deleted from the record of P02. The associated message pattern (P12) is deleted from the record of P11.

Message patterns not actually existing can be deleted from the message pattern table by carrying out the processing described so far.

While one embodiment of the present technique has been described so far, the present technique is not limited thereto. For example, the functional block diagram of the linking processor 3 described above does not always correspond in configuration to an actual program module.

Note that the configuration of each table described above merely forms one example. The present invention is not restricted to the above-described configuration. Furthermore, in the flowcharts, the processing steps may be interchanged in order as long as the results of the processing remain the same. In addition, the steps may be carried out in parallel.

The technique described so far makes it possible to automatically create message patterns used in a message linking process.

If transactions are found after the system has been run or if there are transactions added because of addition of a function or for other cause, it is possible to automatically create message patterns corresponding to the transactions based on predefined message patterns. Messages associated with these transactions can be linked.

It is possible to cope with cases where a transaction that might be linked cannot be identified uniquely.

Because non-existing message patterns are deleted, the maintenance is facilitated.

A decision is made as to whether or not the linking process has been completed after a match with spin-off message patterns is checked. Therefore, even in a case where a new message pattern is created, a message linking process can be performed appropriately.

A program for causing a computer to implement a method associated with the present technique can be created. The program is stored on a computer-readable storage medium (such as a flexible disk, CD-ROM, magnetooptical disk, semiconductor memory, or hard disk) or in a storage device. Furthermore, the program may be distributed via a network. Data being processed is stored in a storage device such as a computer memory.

Figure 26:
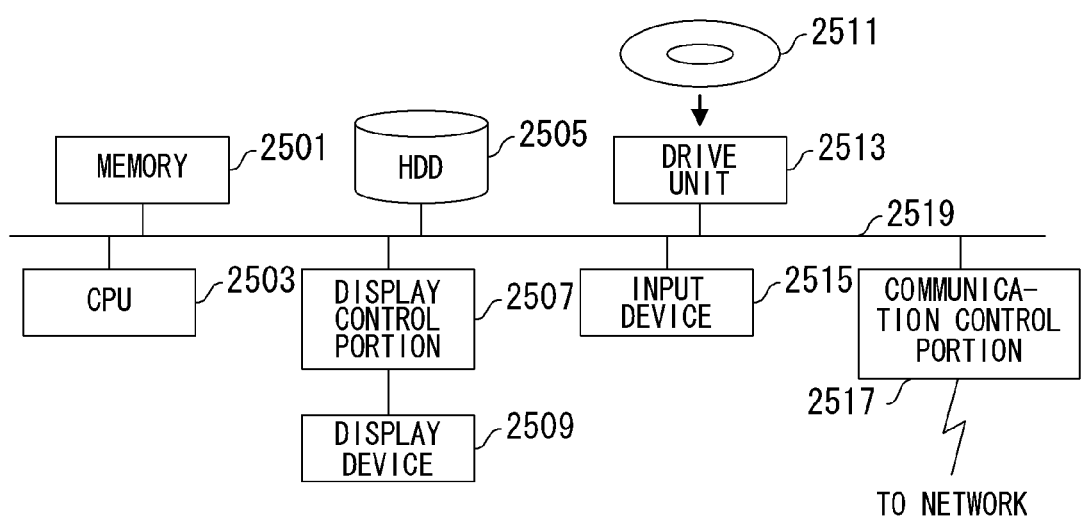
FIG. 26 is a functional block diagram of a computer.

The linking processor 3 and the message collection device 5 are realized by a computer system as shown in FIG. 26. The computer system has a memory 2501 (storage device), a CPU (central processing unit) 2503, a hard disk drive (HDD) 2505, a display control portion 2507 connected with a display device 2509, a drive unit 2513 for a removable disk 2511, an input device 2515, and a communication control portion 2517 for connection with a network. These components are interconnected by a bus 2519. An operating system (OS) and an application program for performing the processing of the present embodiment are stored in the HDD 2505. When the program is executed by the CPU 2503, the program is read into the memory 2501 from the HDD 2505. According to the need, the CPU 2503 controls the display control portion 2507, the communication control portion 2517, and the drive unit 2513 to perform necessary operations. Data being processed is stored in the memory 2501. If necessary, the data is stored in the HDD 2505. In the embodiment of the present technique, an application program for performing the above-described processing is stored on the computer-readable removable disk 2511 and distributed. The program is installed into the HDD 2505 from the drive unit 2513. In some cases, the program may be installed into the HDD 2505 via a network such as the Internet and via the communication control portion 2517. In this computer system, the hardware devices such as the CPU 2503 and memory 2501 are organically coordinated with the OS and the required application programs, thus accomplishing the aforementioned various functions.

The invention claimed is:

1. A non-transitory computer readable storage medium having a computer program stored thereon for creation of message patterns, the program being designed to make a computer perform the steps of:

successively receiving messages each having a linking keyword for identification of a transaction;

classifying the received messages in terms of transaction using message patterns stored in a message pattern storage portion and the linking keyword whenever each of the messages is received;

comparing a series of messages associated with the transaction to which the received message belongs with the message patterns stored in the message pattern storage portion;

making a decision as to whether the series of messages associated with the transaction to which the received message belongs matches any one of the message patterns stored in the message pattern storage portion to thereby make a decision as to whether a linking process is completed;

creating a record including an identifier for the transaction to which the received message belongs and the linking keyword contained in messages associated with the transaction, if the linking process is judged to be completed, and storing the record into a transaction storage portion;

searching the transaction storage portion for each of the classified messages not classified into one of the transactions among the received messages in the receiving step at given timing based on the linking keywords contained in the unclassified messages and identifying the record containing the identical linking keyword;

storing the identifiers for the unclassified messages into a linked candidate list storage portion in a corresponding manner to linked candidate transactions that are transactions associated with the identified record to thereby identify a linked candidate; and adding the unclassified messages stored in the linked candidate list storage portion in a corresponding manner to the linked candidate transaction to the message pattern which is stored in the message pattern storage portion and which corresponds to the linked candidate transaction for each of the linked candidate transactions to thereby create a new message pattern, and storing the created message pattern into the message pattern storage portion.

2. The non-transitory computer readable storage medium according to claim 1, wherein in said step of identifying the linked candidate, the identifiers for the unclassified messages are stored in the linked candidate list storage portion in a corresponding manner to each of the linked candidate transactions in a case where the present linked candidate transactions are plural in number.

3. The non-transitory computer readable storage medium according to claim 1, wherein said message pattern storage portion further stores the number of appearances of said message patterns, wherein the number of appearances of the message patterns matching the series of messages associated with the transaction to which the received message belongs is incremented in said step of storing the record into the transaction storage portion if the linking process is judged to be completed, and wherein said computer program further performs the step of deleting the message patterns whose number of appearances is less than a given reference value from said message pattern storage portion at given timing.

4. The non-transitory computer readable storage medium according to claim 1, wherein in said step of creating the new message pattern, the identifier for the new message pattern is stored in said message pattern storage portion as an identifier for a spin-off message pattern in a corresponding manner to the message pattern providing a basis of the new message pattern, wherein said computer program further repeats said step of making a decision as to whether a linking process is completed using said spin-off message pattern as a comparison reference in a case where an identifier for the spin-off message pattern is stored in the message pattern storage portion in a corresponding manner to the message pattern matching the series of messages associated with the transaction to which the received message belongs if the linking process is judged to be completed, to thereby make a re-decision, and wherein said step of storing the record is performed after said step of making the re-decision.

5. A method for creating a message pattern which is executed by a computer, the method comprising:

successively receiving messages each having a linking keyword for identification of a transaction;

classifying the received messages in terms of transaction using message patterns stored in a message pattern storage portion and the linking keyword whenever each of the messages is received;

comparing a series of messages associated with the transaction to which the received message belongs with the message patterns stored in the message pattern storage portion;

making a decision as to whether the series of messages associated with the transaction to which the received message belongs matches any one of the message patterns stored in the message pattern storage portion to thereby make a decision as to whether a linking process is completed;

creating a record including an identifier for the transaction to which the received message belongs and the linking keyword contained in messages associated with the transaction, if the linking process is judged to be completed, and storing the record into a transaction storage portion;

searching the transaction storage portion for each of the unclassified messages classified into none of the transactions among the received messages at given timing based on the linking keywords contained in the unclassified messages and identifying the record containing the identical linking keyword;

storing the identifiers for the unclassified messages into a linked candidate list storage portion in a corresponding manner to linked candidate transactions that are transactions associated with the identified record to thereby identify a linked candidate; and adding the unclassified messages stored in the linked candidate list storage portion in a corresponding manner to the linked candidate transaction to the message pattern which is stored in the message pattern storage portion and which corresponds to the linked candidate transaction for each of the linked candidate transactions to thereby create a new message pattern and storing the created message pattern into the message pattern storage portion.

6. An apparatus for creating a message pattern comprising:

linking engine means for successively receiving messages each having a linking keyword for identification of a transaction, classifying the received messages in terms of transaction using message patterns stored in a message pattern storage portion and the linking keyword whenever each of the messages is received, comparing a series of messages associated with the transaction to which the received message belongs with the message patterns stored in the message pattern storage portion, making a decision as to whether the series of messages associated with the transaction to which the received message belongs matches any one of the message patterns stored in the message pattern storage portion to thereby make a decision as to whether a linking process is completed, creating a record including an identifier for the transaction to which the received message belongs and the linking keyword contained in messages associated with the transaction, if the linking process is judged to be completed, and storing the record into a transaction storage portion, searching the transaction storage portion for each of the unclassified messages not classified into one of the transactions among the received messages at given timing based on the linking keywords contained in the unclassified messages and identifying the record containing the identical linking keyword, and storing the identifiers for the unclassified messages into a linked candidate list storage portion in a corresponding manner to linked candidate transactions that are transactions associated with the identified record to thereby identify a linked candidate; and message pattern creating means for adding the unclassified messages stored in the linked candidate storage portion in a corresponding manner to the linked candidate transaction to the message pattern which is stored in the message pattern storage portion and which corresponds to the linked candidate transaction for each of the linked candidate transactions to create a new message pattern and storing the created message pattern into the message pattern storage portion.

* * * * *